US012732571B2

(12) United States Patent
Gandhi et al.

(10) Patent No.: US 12,732,571 B2
(45) Date of Patent: Sep. 8, 2026

(54) CONTACT CENTER ADHERENCE AND COMPLIANCE SYSTEM

(71) Applicant: TTEC Digital, LLC, Greenwood Village, CO (US)

(72) Inventors: Dipesh S. Gandhi, Kyle, TX (US); David Paul Johnson, Colorado Springs, CO (US); Waheed Mohammed Abdul, Aurora, CO (US)

(73) Assignee: TTEC Digital, LLC, Austin, TX (US)

(*) Notice: Subject to any disclaimer, the term of this patent is extended or adjusted under 35 U.S.C. 154(b) by 132 days.

(21) Appl. No.: 18/912,264

(22) Filed: Oct. 10, 2024

(65) Prior Publication Data

US 2025/0039283 A1 Jan. 30, 2025

Related U.S. Application Data

(63) Continuation-in-part of application No. 18/600,692, filed on Mar. 9, 2024, now Pat. No. 12,273,431, (Continued)

(51) Int. Cl.
*H04L 69/14* (2022.01)
*H04L 51/02* (2022.01)
(Continued)

(52) U.S. Cl.
CPC .............. *H04L 69/14* (2013.01); *H04L 51/02* (2013.01); *H04L 51/216* (2022.05); *H04L 65/1069* (2013.01)

(58) Field of Classification Search
CPC ... H04L 51/02; H04L 51/216; H04L 65/1069; H04L 69/14
See application file for complete search history.

(56) References Cited

U.S. PATENT DOCUMENTS 6,188,761 B1 2/2001 Dickerman
6,389,400 B1 5/2002 Bushey
(Continued)

FOREIGN PATENT DOCUMENTS

WO WO 2019/034805 2/2019
WO WO 2020/136680 7/2020

OTHER PUBLICATIONS

International Searching Authority, International Search and Written Opinion, mailed Jan. 12, 2022.
(Continued)

*Primary Examiner* — Gil H. Lee
(74) *Attorney, Agent, or Firm* — Critical Path IP Law, LLC

(57) ABSTRACT

Systems and methods for adherence and compliance of contact center agents, and more specifically to systems and methods of monitoring, identifying, and correcting deviations of contact center agents from ideal workflows and checklists. In one aspect, the system monitors agent-customer interactions and assesses adherence to compliance guidelines through analysis of agent and customer utterances, identifying non-compliant situations and suggesting actions for correction. Each contact center agent is provided compliance assistance through a visual progress indicator or a checklist feature. A supervisor system provides monitoring of a set of contact center agents and notice of non-compliant situations.

20 Claims, 11 Drawing Sheets

Related U.S. Application Data which is a continuation of application No. 17/499,931, filed on Oct. 13, 2021, now Pat. No. 11,930,097.

(60) Provisional application No. 63/091,854, filed on Oct. 14, 2020.

(51) Int. Cl.
*H04L 51/216* (2022.01)
*H04L 65/1069* (2022.01)

(56) References Cited

U.S. PATENT DOCUMENTS

| | | | | |
|---|---|---|---|---|
| 6,549,949 | B1 | 4/2003 | Bowman-Amuah | |
| 10,572,517 | B2 | 2/2020 | Canim | |
| 10,936,828 | B2 | 3/2021 | Le | |
| 2013/0268260 | A1 | 10/2013 | Lundberg | |
| 2014/0095501 | A1 | 4/2014 | Niheu | |
| 2016/0099892 | A1 | 4/2016 | Palakovich | |
| 2017/0180284 | A1 | 6/2017 | Smullen | |
| 2017/0344889 | A1 | 11/2017 | Sengupta | |
| 2017/0366621 | A1 | 12/2017 | Sagar | |
| 2018/0212904 | A1 | 7/2018 | Smullen | |
| 2019/0044829 | A1 | 2/2019 | Balzer | |
| 2019/0102078 | A1 | 4/2019 | Bhatt | |
| 2019/0188268 | A1 | 6/2019 | Le | |
| 2019/0281159 | A1 | 9/2019 | Segalis | |
| 2019/0311374 | A1 | 10/2019 | Dai | |
| 2020/0111377 | A1 | 4/2020 | Truong | |
| 2020/0134022 | A1 | 4/2020 | Millius | |
| 2020/0168209 | A1* | 5/2020 | Iannone | G10L 15/26 |
| 2020/0184992 | A1* | 6/2020 | Newell | G06Q 30/0631 |
| 2020/0227026 | A1* | 7/2020 | Rajagopal | G06F 16/244 |
| 2020/0249743 | A1 | 8/2020 | Kumar Addepalli | |
| 2020/0293465 | A1 | 9/2020 | Yang | |
| 2020/0311560 | A1 | 10/2020 | Magin | |
| 2020/0334740 | A1 | 10/2020 | Bedell | |
| 2021/0241241 | A1 | 8/2021 | Lokanath | |
| 2021/0350263 | A1 | 11/2021 | Koneru | |
| 2021/0392093 | A1 | 12/2021 | Mia | |
| 2022/0021630 | A1 | 1/2022 | Goyal | |
| 2023/0244877 | A1* | 8/2023 | Goyal | G06F 3/0484 704/9 |
| 2023/0379283 | A1* | 11/2023 | Chinnalagu | G06N 20/00 |
| 2025/0088365 | A1* | 3/2025 | Ferenczi | H04L 51/02 |

OTHER PUBLICATIONS

USPTO Non-Final Office Action in U.S. Appl. No. 17/499,931 mailed Jan. 30, 2023.

USPTO Final Office Action in U.S. Appl. No. 17/499,931 mailed Aug. 22, 2023.

USPTO Notice of Allowance in U.S. Appl. No. 17/499,931 mailed Dec. 27, 2023.

USPTO Non-Final Office Action in U.S. Appl. No. 18/600,692 mailed Sep. 27, 2024.

USPTO Notice of Allowance in U.S. Appl. No. 18/600,692 mailed Feb. 26, 2025.

* cited by examiner

CONTACT CENTER ADHERENCE AND COMPLIANCE SYSTEM

CROSS REFERENCE TO RELATED APPLICATIONS

This application is a Continuation-in-Part of U.S. patent application Ser. No. 18/600,692 filed Mar. 9, 2024 and titled "Integrated Orchestration of Intelligent Systems," which in turn claims the benefit of U.S. patent application Ser. No. 17/499,931 (now U.S. Pat. No. 11,930,097) filed Oct. 13, 2021 and titled "Integrated Orchestration of Intelligent Systems, which in turn claims the benefit of U.S. Provisional Patent Application No. 63/091,854, filed Oct. 14, 2020 and titled "Integrated Orchestration of Intelligent Systems," the disclosures of which are hereby incorporated herein by reference in entirety.

FIELD

The disclosure relates generally to the integrated orchestration of intelligent systems, and more specifically to systems and methods of harvesting and combining aspects of disparate intelligent systems for use in intelligent virtual assistant applications and automation applications. The disclosure also relates generally to the adherence and compliance of contact centers, and more specifically to systems and methods of monitoring, identifying, and correcting deviations of contact center agents from ideal workflows and checklists.

BACKGROUND

Existing intelligent systems use unique components to provide cognitive services. Each intelligent system has a set of specialized components unique to that particular system, such components enabling functions such as programming, operation, and training of the intelligent system. Furthermore, existing intelligent systems have unique software interfaces requiring customized and time-consuming integration across other intelligent systems. When a set of intelligent systems providing cognitive services are implemented in an intelligent virtual assistant environment, custom integrations between input channels, human agents, and the cognitive engines of the disparate intelligent systems are required. Such custom integrations are typically complex, requiring substantial effort in time and resources for implementation. Maintenance and upgrade to such integrations are also resource intensive and problematic, compromising overall system stability and reliability.

What is needed is an intelligent systems orchestration system that efficiently and effectively integrates a set of disparate intelligent systems for use in intelligent virtual assistant (IVA) applications. The disclosure solves this need. The disclosed intelligent systems orchestration system provides many benefits, such as the ability to mix and match, and combine, cognitive sources from disparate intelligent systems sources such that the overall system is agnostic to any particular intelligent system and associated specialized components. The disclosed system also allows exposure or training of systems to occur through a unified means, rather than through multiple disparate means as is conventional, and to expose or train systems by way of multiple channels.

Existing customer contact systems do not provide comprehensive, robust, and accurate capabilities to monitor and assist customer contact agents, resulting in inconsistent agent performance and occasional customer frustration.

What is needed is a system that provides automated customer contact center adherence and compliance monitoring and correction. The disclosure solves those needs. The disclosed customer contact center adherence and compliance system monitors, identifies, and corrects deviations of contact center agents from ideal workflows and checklists. Each contact center agent is provided compliance assistance through a visual progress indicator or a checklist feature. A supervisor system provides monitoring of a set of contact center agents and notice of non-compliant situations.

The phrases "intelligent system," "artificial intelligence," "bot" or "Bot," and "AI" mean a machine, system or technique that mimics human intelligence.

The phrase "machine learning" means a subset of AI that uses statistical techniques to enable machines to improve at tasks with experience.

The phrases "neural networks" and "neural nets" means an AI construction modeled after the way adaptable networks of neurons in the human brain are understood to work, rather than through rigid predetermined instructions.

The phrase "natural-language processing" means computer processing that occurs in speech-recognition technology in which software recognizes spoken sentences or phrases and recreate spoken language into text.

By way of providing additional background, context, and to further satisfy the written description requirements of 35 U.S.C. § 112, the following are incorporated by reference in entirety: U.S. Pat. Publ. Nos. 2020/0111377 to Truong et al; 2017/0344889 to Sengupta et al; 2019/0311374 to Dai et al; and 2014/0095501 to Niheu et al; U.S. Pat. No. 10,572,517 to Canim et al; U.S. Pat. No. 6,389,400 to Bushey et al; and U.S. Pat. No. 6,188,761 to Dickerman et al; and WIPO Appl. Nos. 2020/136680 to Sabharwal and 2019/034805 to Asghar.

SUMMARY

The present disclosure can provide several advantages depending on the particular aspect, embodiment, and/or configuration.

Generally, systems and methods to provide integrated orchestration of intelligent systems are disclosed, the systems and methods harvesting and combining aspects of disparate intelligent systems for use in intelligent virtual assistant applications.

The intelligent systems orchestration system of the disclosure provides, among other things, an intelligent integration, leveraging, and/or synergistic harvesting between cognitive plugins, CRM (customer relationship management) plugins, KMS (knowledge management system) plugins, Automation/RPA (robotic process automation) plugins, integration plugins, digital and analog communication channels, and multiple ACD (automatic call distributor) systems. Cognitive plugins include, but are not limited to, natural language processing (chatbots/IVAs, text translation, text analysis, text generation), sentiment analysis, speech recognition, text-to-speech, and computer vision. The intelligent systems orchestration system supports the building and deployment of cognitive applications (e.g., training, agent assist, customer assist, next best action and compliance) for enhancing a brand customer experience, and agent proficiency. The system also provides multi-IVA orchestration and supports session, context, and state management. Furthermore, the intelligent systems orchestration system includes a Conversation Control Language for the normalization of conversations across multiple channels and bots.

In one embodiment, an intelligent systems orchestration system is described, the system comprising: an orchestration system engine comprising a computer processor and a system database, the computer processor having machine-executable instructions operating to: receive, from a user, a first channel data stream of a first channel protocol; create a standardized protocol first channel data stream of a standardized protocol from the first channel data stream; receive, from the user, a second channel data stream of a second channel protocol; create a standardized protocol second channel data stream of the standardized protocol from the second channel data stream; provide the standardized protocol first channel data stream and the standardized protocol second channel data stream to a first NL (natural language) bot of a first cognitive service; establish a first interactive communication session between the user and the first NL bot, the first interactive communication session associated with both of the standardized protocol first channel data stream and the standardized protocol second channel data stream; record first channel conversation topic data associated with the first interactive communication session; upon identification of a pause datum of the first interactive communication session, transfer the first channel conversation topic data to a second NL bot of a second cognitive service; and establish a second interactive communication session between the user and the second NL bot.

In one aspect, the first channel protocol is different than the second channel protocol. In another aspect, the first cognitive service has a different communication protocol than the second cognitive service. In another aspect, the first channel data stream is an analog voice channel and the second channel data stream is a digital data stream. In another aspect, the standardized protocol is JavaScript Object Notation. In another aspect, each of the standardized protocol first channel data stream and the standardized protocol second channel data stream are stored in the system database. In another aspect, the system database is an open source relational database. In another aspect, the first NL bot operates as a natural language bot and the second NL bot operates as a natural language bot. In another aspect, the machine-executable instructions further operate to: train both of the first NL bot and the second NL bot using both of the standardized protocol first channel data stream and the standardized protocol second channel data stream.

In another embodiment, an intelligent systems orchestration system is disclosed, the system comprising: an orchestration system engine comprising a computer processor and a system database, the computer processor having machine-executable instructions operating to: receive, from a user, a first channel data stream of a first channel protocol; create a standardized protocol first channel data stream of a standardized protocol from the first channel data stream; receive, from the user, a second channel data stream of a second channel protocol; create a standardized protocol second channel data stream of the standardized protocol from the second channel data stream; provide the standardized protocol first channel data stream and the standardized protocol second channel data stream to a first NL bot of a first cognitive service; establish a first interactive communication session between the user and the first NL bot, the first interactive communication session comprising the standardized protocol first channel data stream and the standardized protocol second channel data stream; train the first NL bot using data from the first interactive communication session; provide the standardized protocol first channel data stream and the standardized protocol second channel data stream to a second NL bot of a second cognitive service; and train the second NL bot using data from the first interactive communication session; wherein: the first channel protocol is different than the second channel protocol.

In one aspect, the first cognitive service has a different communication protocol than the second cognitive service. In another aspect, the first channel data stream is an analog voice channel, and the second channel data stream is a digital data stream. In another aspect, the first NL bot operates as a natural language bot and the second NL bot operates as a natural language bot.

In another embodiment, a method of integrating multiple intelligent systems is described, the method comprising: providing an intelligent systems orchestration system comprising a user interface and an orchestration system engine, the orchestration engine comprising a system database and a computer processor having machine-executable instructions; receiving, by the user interface, a first channel data stream of a first channel protocol; receiving, by the user interface, a second channel data stream of a second channel protocol; providing the first channel data stream and the second channel data stream to the computer processor; performing machine-executable instructions by the computer processor to: create a standardized protocol first channel data stream of a standardized protocol from the first channel data stream; create a standardized protocol second channel data stream of the standardized protocol from the second channel data stream; provide the standardized protocol first channel data stream and the standardized protocol second channel data stream to a first NL bot of a first cognitive service; establish a first interactive communication session between the user and the first NL bot, the first interactive communication session associated with both of the standardized protocol first channel data stream and the standardized protocol second channel data stream; record first channel conversation topic data associated with the first interactive communication session; upon identification of a pause datum of the first interactive communication session, transfer the first channel conversation topic data to a second NL bot of a second cognitive service; establish a second interactive communication session between the user and the second NL bot.

In one aspect, the first channel protocol is different than the second channel protocol. In another aspect, the first cognitive service has a different communication protocol than the second cognitive service. In another aspect, the first channel data stream is an analog voice channel and the second channel data stream is a digital data stream. In another aspect, the first NL bot operates as a natural language bot and the second NL bot operates as a natural language bot. In another aspect, each of the standardized protocol first channel data stream and the standardized protocol second channel data stream are stored in the system database. In another aspect, the machine-executable instructions further operate to: train both of the first NL bot and the second NL bot using both of the standardized protocol first channel data stream and the standardized protocol second channel data stream.

In another embodiment, a customer contact center adherence and compliance system is disclosed, the system comprising: a set of agent systems each associated with an agent and comprising an agent widget with an agent GUI, the set of agent systems comprising a first agent system configured to: i) communicate with a first customer in a first session, ii) create first session data comprising first session data utterances, and iii) render a first session display associated with the first session data; a system server comprising an in-memory datastore, a system database, and an AI engine, the in-memory datastore comprising first session compliance guidelines comprising a set of first session guideline tasks, the system database comprising conversational and compliance records, the AI engine comprising a computer processor configured to: i) receive the first session data from the first agent system, ii) assess the first session data utterances against the first session compliance guidelines to determine a first session status and a first session compliance, and iii) identify a corrective action if the first session compliance is negative; and a supervisor system comprising a supervisor GUI and configured to: i) receive the first session data, and ii) to receive the first session status and the first session compliance from the system server; wherein: the first agent system communicates the first session data to the system server; the computer processor performs machine-executable instructions to: determine a first session status comprising a completion status of the set of first session guideline tasks; determine a first session compliance; communicate the first session status and the first session compliance to each of the first agent system and the supervisor system; and if the first session compliance is negative, identify the corrective action and communicate the corrective action to the first agent system.

In one aspect, the session compliance guidelines are a set of session compliance guidelines associated with a set of session topics, to include a first session topic compliance guideline associated with a first session topic. In another aspect, the first session compliance is determined by comparing a particular session topic compliance guideline against the first session data, the particular session topic compliance guideline determined by searching the system database by the first session topic. In another aspect, the first session topic is determined by analysis of the first session data utterances. In another aspect, the computer processor further performs machine-executable instructions to catalog a task status of each of the set of first session guideline tasks based on the first session utterances and communicating the tsk status to the first agent system, the first agent system rendering a display associated with the task status. In another aspect, the computer processor further performs machine-executable instructions to create a real-time transcript of the first session data utterances, the real-time transcript communicated to the first agent system. In another aspect, the computer processor further performs machine-executable instructions to redact any PII data in the real-time transcript to create a redacted real-time transcript, the redated real-time transcript communicated to the first agent system. In another aspect, the computer processor further performs machine-executable instructions to determine a first agent sentiment score based on the first session data utterances. In another aspect, the first agent sentiment score is communicated to the supervisor system. In another aspect, the corrective action is one or more of a suggested answer and a suggested article.

In another embodiment, a method of using a customer contact center adherence and compliance system is disclosed, the method comprising: providing a customer contact center adherence and compliance system comprising: a set of agent systems each associated with an agent and comprising an agent widget with an agent GUI, the set of agent systems comprising a first agent system configured to: i) communicate with a first customer in a first session, ii) create first session data comprising first session data utterances, and iii) render a first session display associated with the first session data; a system server comprising an in-memory datastore, a system database, and an AI engine, the in-memory datastore comprising first session compliance guidelines comprising a set of first session guideline tasks, the system database comprising the conversational and compliance records, the AI engine comprising a computer processor configured to: i) receive the first session data from the first agent system, ii) assess the first session data utterances against the first session compliance guidelines to determine a first session status and a first session compliance, and iii) identify a corrective action if the first session compliance is negative; and a supervisor system comprising a supervisor GUI and configured to: i) receive the first session data, and ii) to receive the first session status and the first session compliance from the system server; communicating the first session data to the system server using the first agent system; performing machine-executable instructions using the computer processor to: determine a first session status comprising a completion status of the set of first session guideline tasks; determine a first session compliance; communicate the first session status and the first session compliance to each of the first agent system and the supervisor system; and if the first session compliance is negative, identify the corrective action and communicate the corrective action to the first agent system.

In one aspect, the session compliance guidelines are a set of session compliance guidelines associated with a set of session topics, to include a first session topic compliance guideline associated with a first session topic. In another aspect, the first session compliance is determined by comparing a particular session topic compliance guideline against the first session data, the particular session topic compliance guideline determined by searching the system database by the first session topic. In another aspect, the first session topic is determined by analysis of the first session data utterances. In another aspect, the computer processor further performs machine-executable instructions to catalog a task status of each of the set of first session guideline tasks based on the first session utterances and communicating the tsk status to the first agent system, the first agent system rendering a display associated with the task status. In another aspect, the computer processor further performs machine-executable instructions to create a real-time transcript of the first session data utterances, the real-time transcript communicated to the first agent system. In another aspect, the computer processor further performs machine-executable instructions to redact any PII data in the real-time transcript to create a redacted real-time transcript, the redated real-time transcript communicated to the first agent system. In another aspect, the computer processor further performs machine-executable instructions to determine a first agent sentiment score based on the first session data utterances. In another aspect, the first agent sentiment score is communicated to the supervisor system. In another aspect, the corrective action is one or more of a suggested answer and a suggested article.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably. The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The word "app" or "application" means a software program that runs as or is hosted by a computer, typically on a portable computer, and includes a software program that accesses web-based tools, APIs and/or data.

The phrase "cloud computing" or the word "cloud" refers to computing services performed by shared pools of computer resources, often over the Internet.

The phrase "user interface" or "UI", and the phrase "graphical user interface" or "GUI", means a computer-based display that allows interaction with a user with aid of images or graphics. The phrase "data sources" means a collection of accessible data that is accessed at a known location, to include physical locations such as a physical database and a virtual location, such as on a computing or storage cloud. Also, the term "database" is not limited to a physical database, and may, for example, define a broader data source.

Various embodiments or portions of the system methods of use may also or alternatively be implemented partially in software and/or firmware, e.g., metrics and/or guidelines to alter the training scenarios or customer personas, etc. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

It should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

The following disclosure generally relates to an intelligent system orchestration system that harvests and combines aspects of disparate intelligent systems for use in intelligent virtual assistant applications. The intelligent system orchestration system may be referred to as "orchestration system," the "system," the "digital worker factory," and/or the "DWF." Aspects of an intelligent system orchestration system will be described with respect to FIGS. 1-5. Aspects of a customer contact center adherence and compliance system will be described with respect to FIGS. 6-10.

Figure 1:
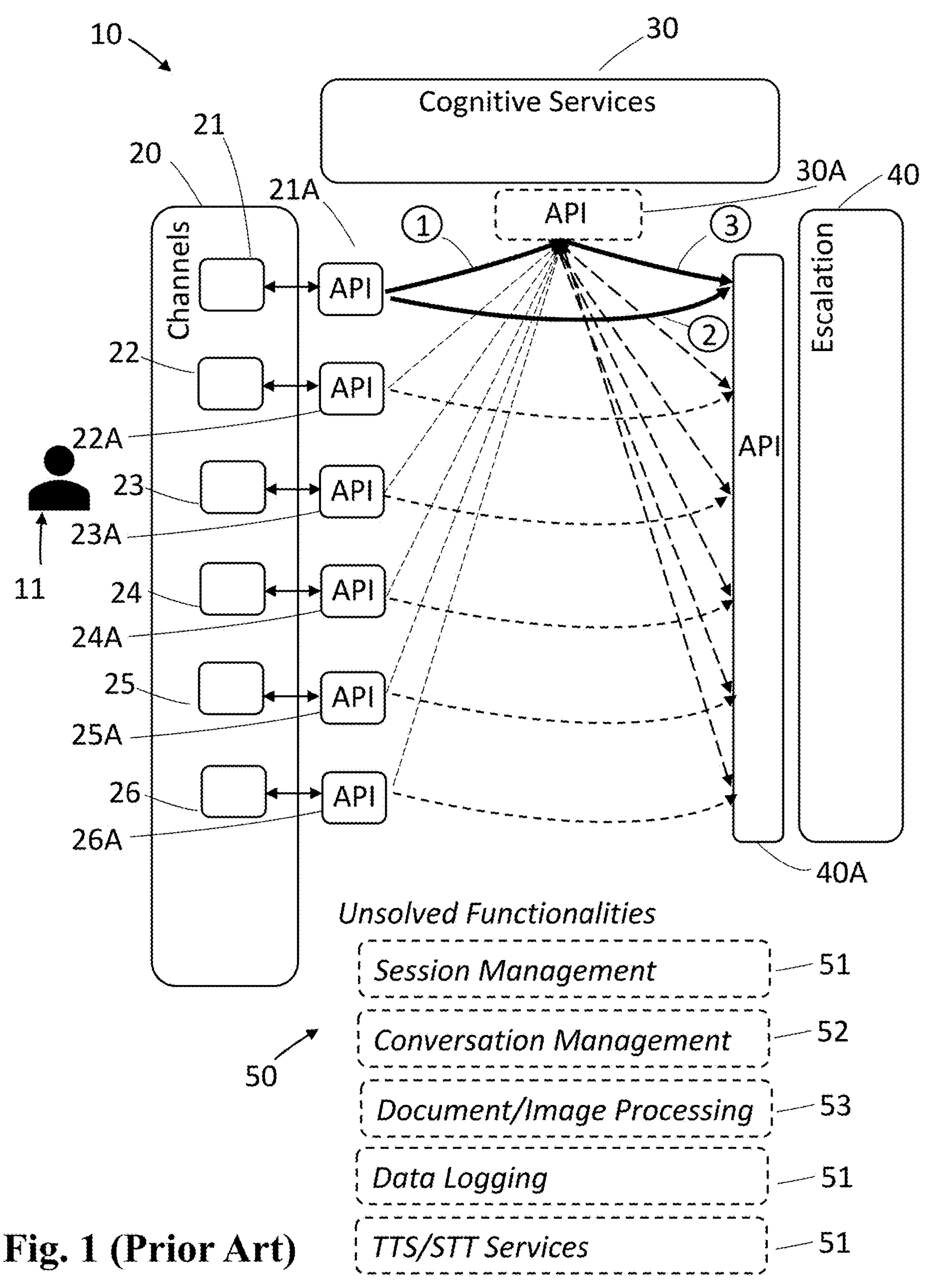
FIG. 1 is a schematic diagram of a conventional approach to handling multi-channel intelligent systems operations of the prior art.

FIG. 1 is a schematic diagram of a conventional system 10 of the prior art to handle multi-channel intelligent systems operations.

Each intelligent system has a set of specialized components unique to that particular system; such components enable functions such as programming, operation, and training of the intelligent system. Furthermore, existing intelligent systems have unique software interfaces requiring customized and time-consuming integration across other intelligent systems. When a set of intelligent systems providing cognitive services are implemented in an intelligent virtual assistant (IVA) environment, custom integrations between input channels, human agents, and the cognitive engines of the disparate intelligent systems are required. Such custom integrations are typically complex, requiring substantial effort in time and resources for implementation. Maintenance and upgrade to such integrations are also resource intensive and problematic, compromising overall system stability and reliability.

The conventional system 10 of the prior art requires specialized interfaces between each channel of the channel set 20, cognitive services 30, and any escalation party 40 involved. Cognitive services 30 may include intelligent virtual assistants (IVAs) and other AI-related components, as described below. The escalation party 40 or parties are humans and may include customer care agents, customer care supervisors, etc.

Two intelligent virtual assistant applications or use cases are of particular interest and will be discussed and considered in the disclosure: customer assistance and agent assistance. In customer assistance, a user 11 who is a customer of the system 10 seeks customer care through the system 10. For example, the customer may call or text the system 10 seeking assistance with a billing question. Such is the typical case when a customer phones a call center seeking assistance (e.g., to pay a bill to a phone company) or to take some action (e.g., to file an insurance claim). In agent assistance, a customer care agent is in need of assistance in handling or dealing with a customer. Such may be the case when the agent is working at a call center and encounters a customer who is belligerent or otherwise uncooperative with the agent.

The specialized interfaces typically involve or are specialized APIs, i.e., specialized Application Programming Interfaces for each channel of the channel set 20. A channel refers to a communication channel of a user 11. For example, a user 11 may engage the conventional system using a chat channel 21, which requires a specialized chat channel API 21A to engage or communicate with either the cognitive services 30 or escalation parties 40. Similarly, a user 11 may engage the conventional system 10 using an SMS channel 22 that requires an SMS channel API 22A, using a WhatsApp channel 23 requiring a WhatApp API 23A, using a Twitter channel 24 requiring a Twitter API 24A, and/or using a Facebook channel 25 requiring a Facebook channel API, and the like. Channel 26 is a voice channel, with associated specialized voice API 26A. Note that each of the specialized channel APIs typically require separate integrations for communication with cognitive services 30 as well as with escalation parties 40. Stated another way, typically two integrations are required for each communication channel type: one to interact with or communicate with cognitive services, and another to interact with or communicate with escalation agents 40. The interaction of any particular channel of the channel set 20 is by way of a cognitive services API 30A. Other channels of communication as known to those skilled in the art are possible.

The communication or integration between the cognitive services 30 and the cognitive services API 30A also requires a unique API that maps to the unique channel input. For example, chat channel 21 communicates through chat channel API 21A with cognitive services 30 and cognitive services 30A (identified as circled 1 in FIG. 1) and requires a specialized integration to in turn for the cognitive services 30 to communicate with escalation parties 40 through escalation parties API 40A (identified as circled 3 in FIG. 1). Also, a direct communication between chat channel 21, by way of chat channel API 21A, with escalation parties 40 and escalation party API 40A requires yet a third specialized integration (identified as circled 2 in FIG. 1). Therefore, each channel of the channel set 20 requires three specialized integrations. The requirement of three specialized integrations for each channel results in burdensome complexity and increased costs and time to implement and maintain.

Additionally, the conventional system leaves unsolved several beneficial functions that require commonality and/or unified integration of the channel sets 20 with the cognitive services 30 and escalation parties 40, to include session management 51, conversation management 52, document/image processing 53, data logging 54, and TTS/STT services 55.

In contrast, as described in the disclosure, the intelligent systems orchestration system of the disclosure efficiently and effectively integrates a set of disparate intelligent systems for use in intelligent virtual assistant applications. The disclosed intelligent systems orchestration system provides many benefits, such as the ability to mix and match, and combine cognitive sources from disparate intelligent systems sources such that the overall system is agnostic to any particular intelligent system and associated specialized components.

Figure 2:
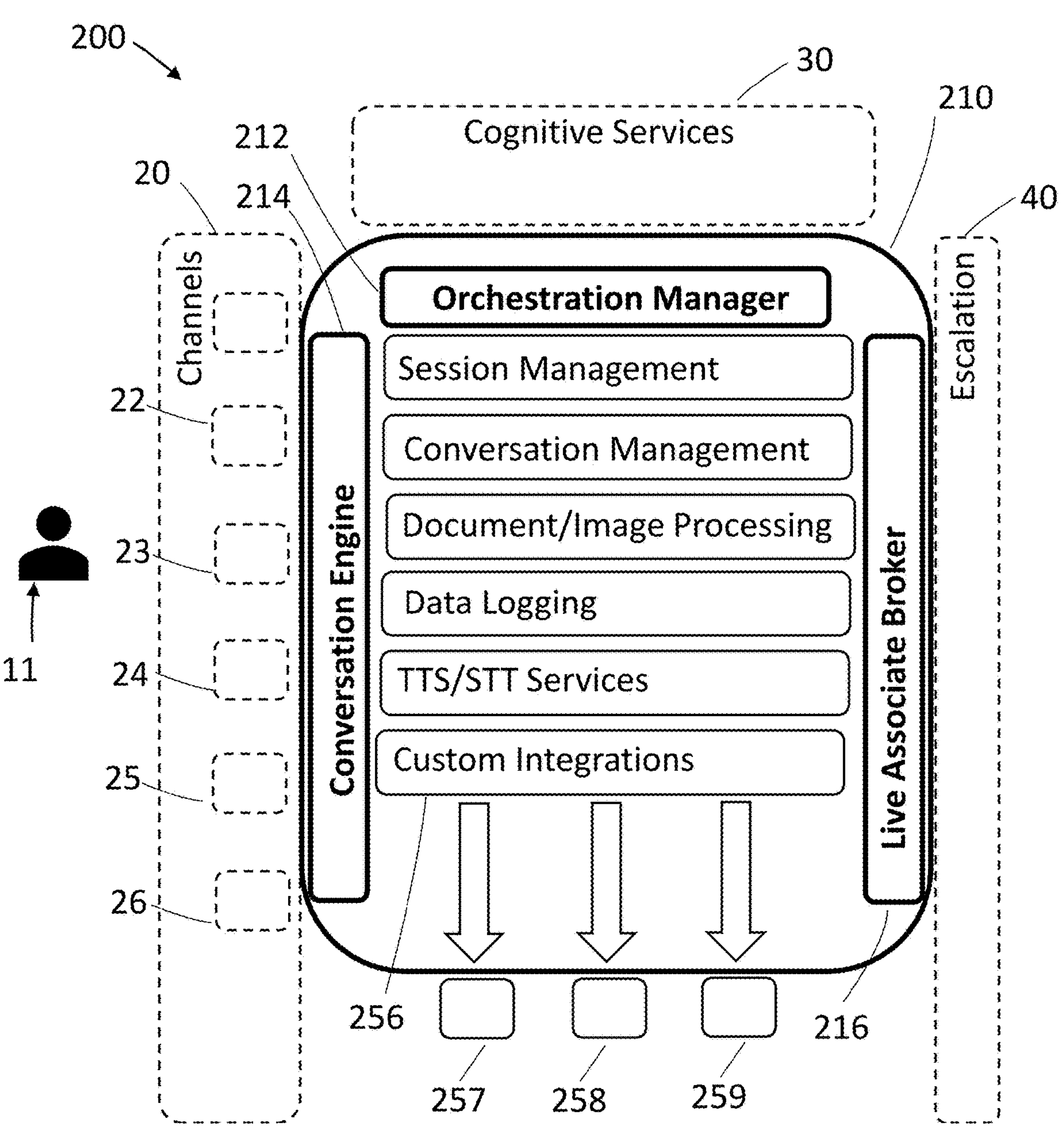
FIG. 2 is a schematic diagram of one embodiment of an intelligent systems orchestration system of the disclosure.

FIG. 2 is a schematic diagram of one embodiment of an intelligent systems orchestration system 200, represented in a similar manner to the convention system 10 of FIG. 1 to highlight differences. The intelligent systems orchestration system 200 may be referred to simply as system or system 200. The system 200 comprises an orchestration system engine 210. The orchestration system engine 210 comprises an orchestration manager 212, conversation engine 214, and live associate broker interface 216. The orchestration system engine 210 may include one or more of the functions or services or capabilities left unsolved in the conventional system 10, e.g., those of session management 51, conversation management 52, document/image processing 53, data logging 54, and TTS/STT (text to speech, speech to text) services 55. Also, the orchestration system engine 210 may provide custom integrations 256 and may output or produce system-wide or comprehensive reporting and/or monitoring, to include data analytics 257, performance monitoring 258, and data repositories 259.

The system 200 receives, through the conversation engine 214, one of more inputs from a user 11 by way of one or more channels 21-26. (Note that the channels of the channel set 20 comprise analog and digital communication channels).

Each of the orchestration manager 212, conversation engine 214, and live associate broker interface 216 are configured to avoid and not require the specialized APIs of the conventional system 10 to enable a unified and integrated interaction between the channel set 20, cognitive services 30, and escalation parties 40.

The conversation engine 214 receives one or more inputs from the one or more channels 21-26 of the channel set 20. The one or more channels may be analog and/or digital signals, and may include channels depicted in FIGS. 1-2 and those known to those skilled in the art. Generally, the channels of the channel set 20 include channels output from smart devices (e.g., SMS) and those from social media via a smart device (e.g., Twitter), and also voice or phone channels. The one or more channels have unique protocols or communication interfaces or communication requirements, which in the conventional system 10 require unique APIs to receive. In contrast, the conversation engine 214 is configured to receive the one or more channel inputs through a common interface such that the received channel set input data may be in turn be transferred or communicated to other areas or modules of the orchestration system engine 210, such as one or both of the orchestration manager 212 and the live associate broker interface 216. The conversation engine 214 receives the disparate channel set input data 311A from the one or more channels 21-26 of the channel set 20 and creates or outputs standardized channel set data 311B (See FIG. 3 as to elements 311A and 311B). Also, the standardized channel set data 311B may be used to drive or enable one or more of the functions left unsolved in the conventional system 10, e.g., those of session management 51, conversation management 52, document/image processing 53, data logging 54, and TTS/STT services 55, and also the custom integrations 256 which may output or produce system-wide or comprehensive reporting and/or monitoring, to include data analytics 257, performance monitoring 258, and data repositories 259.

The orchestration manager 212, among other things, provides a unified interface between the orchestration system engine 210 and one or more cognitive services 30. More specifically, the orchestration manager 212 enables a seamless interaction or communication between one or more channels 21-26 of the channel set 20 and one or more cognitive services. The orchestration manager 212 receives the channel set standardized data 311B, as created or generated or output from the conversation engine 214, and inputs or transfers that standardized channel set data 311B to one or more cognitive services 30 so as to provide an interaction, e.g., between a particular channel 21-26 provided by a user 11 and a particular cognitive service 30, such as an IVA of a particular cognitive service 30. The orchestration manager 212 may also interact or communicate with the one or more of the session management 51, conversation management 52, document/image processing 53, data logging 54, and TTS/STT services 55, and also the custom integrations 256 elements. Furthermore, the orchestration manager 212, as required, may communicate or interact with the live associate broker interface 216. For example, if a particular interaction between a user 11 via a particular channel 21-26 of the channel set 20, as enabled by passing of standardized channel set data 311B to the orchestration manager 212 to drive an interaction with a particular cognitive service 30 such as a first IVA requires escalation (meaning, e.g., the user 11 seeks engagement with a human given unsatisfying interaction with the particular IVA), the orchestration manager 212 provides escalation standardized data to the live associate broker interface 216. Such escalation standardized data may include transcripts of the interaction or communication between the user 11 and the particular IVA.

More generally, the orchestration manager 212 may escalate and hand off the channel conversation to a live agent if the bot is unable to assist, or if the customer requests to speak to a live agent. In the event of escalation, the chat transcript and any other key-value-pair values are handed off to the escalation platform so it can be delivered to the live agent.

The live associate broker interface 216 receives one or more of the standardized channel set data 311B and the escalation standardized data to provide or enable an interface to one or more escalation parties, such as a customer care agent or a supervisor.

The system 200, through the orchestration manager 212, conversation engine 214, and/or live associate broker interface 216 of the orchestration system engine 210, supports use cases or applications such as Associate Assist and Customer Assist, as described below. Furthermore, the orchestration system engine 210 enables third party cognitive services integrations (aka with the cognitive services element 30) to include those of NLP (natural language processing), NLU (natural language understanding), STT, TTS, AI Services, RPA/RDA (robotic process automation, robotic desktop automation. Also enabled by the orchestration system engine 210 is a unified and single source for reporting and monitoring of user 11 interaction with the system 200 and all interactions with one or more cognitive services 30 (e.g., one or more IVAs of one or more cognitive services 30 applications) and/or one or more escalations with escalation element 40. Such recordings, reporting, and/or monitoring data may include all state conditions of the cognitive services and/or escalation (state meaning characteristics of the entity, e.g., for an escalation, the name of the escalation agent, training level or experience of the particular escalation agent, etc.) and/or state conditions of the user 11 (e.g., frequency of calls or interactions with the system 20, particulars of the issue(s) the user 11 is addressing through the system 200, etc.).

Figure 3:
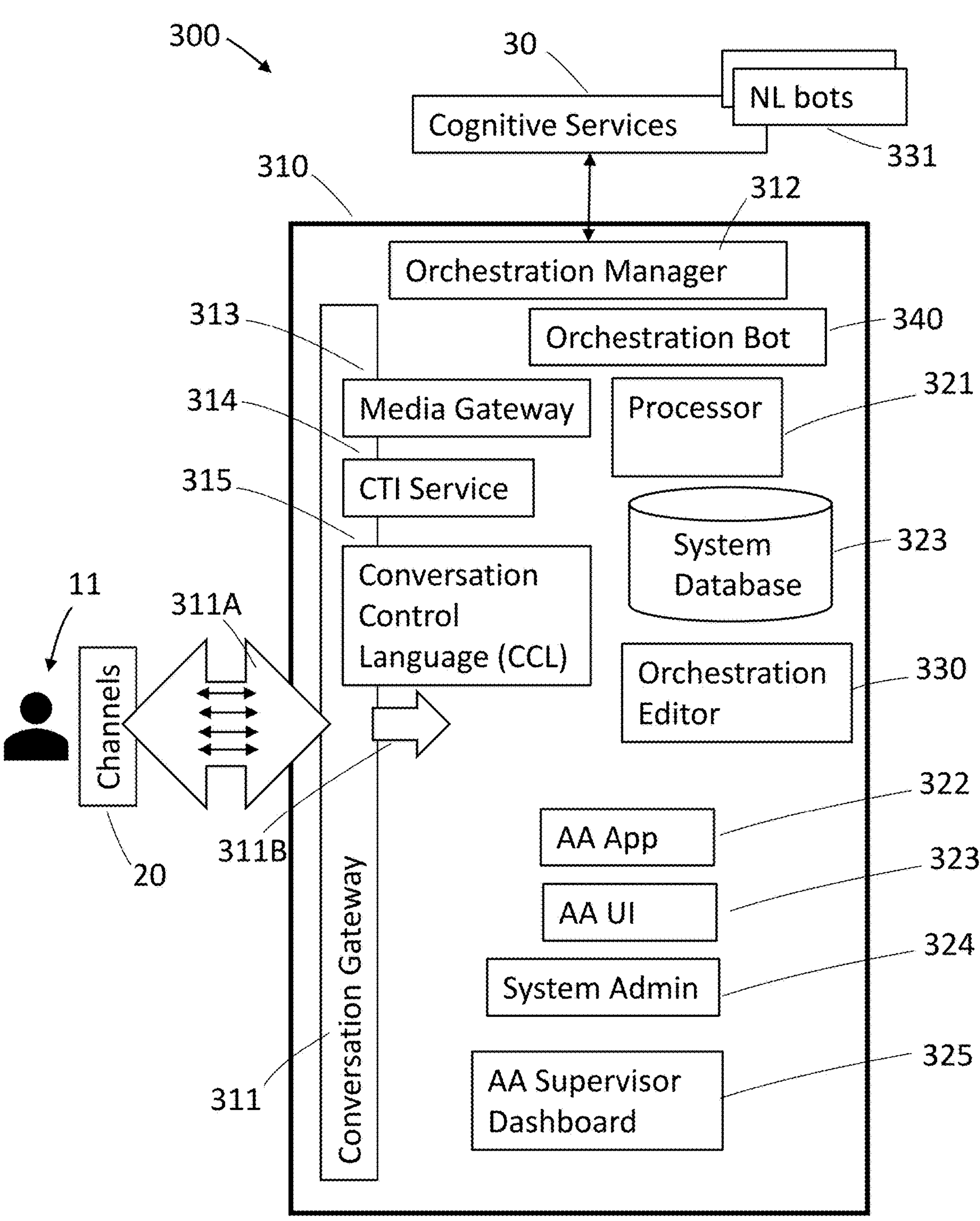
FIG. 3 is an alternate schematic diagram of the intelligent systems orchestration system of FIG. 2.

FIG. 3 is an alternate schematic diagram of the intelligent systems orchestration system 300 of FIG. 2. The intelligent systems orchestration system 300 may be referred to as system 300.

The intelligent systems orchestration system 300 interacts with user 11 and cognitive services 30 and may be configured for one or more particular applications or use cases, such as a customer assist application and an agent assist application. (Sec, e.g., U.S. Pat. Publ. Nos. 2020/0111377 to Truong et al as referenced above for a description of customer service operations and roles/responsibilities of parties involved).

The intelligent systems orchestration system 300 comprises orchestration system engine 310, which in turn comprises orchestration manager 312. The orchestration manager 312 receives disparate channel set input data 311A from the one or more channels 21-26 of the channel set 20 and creates or outputs channel set standardized data 311B, as briefly described above with respect to FIG. 2. The disparate channel set input data 311A is created through input from user 11.

The orchestration manager 312, aka the "orchestrator," is responsible for being embedded into the conversation (e.g., via a voice channel 26, messaging channel such as chat channel 21) with a user 11 so that a digital worker bot 340 and/or one or more NL (natural language) bots 331 are enabled to assist either the user 11 (the user 11 may be, e.g., a customer in the customer assist use case and an agent in the associate assist uses cases). The orchestrator provides a canvas of nodes that can be combined to build a unique bot experience for each customer. In these flows one can combine one or more NLU bots of choice into the conversation (e.g., DialogFlow, Watson Assistant, Rulai, NLU/Sentiment, etc.), or other nodes that support knowledge or actions such as RPA, KMS systems, and CRM.

The cognitive service 30 element comprises one or more NL bots 331 and may comprise a set of NL bots 31, such as a first NL bot and a second NL bot. Each of the set of bots may be capable of interaction with a user 11 to create a set of conversation topics and to conduct a conversation with a user. For example, a first NL bot may conduct a first NL bot conversation comprising one or more topics, e.g., comprising a first NL bot first conversation topic, a first NL bot second conversation topic, and the like. Any given point during a first NL bot conversation may be termed a first NL bot conversation datum. Similarly, a second NL bot may conduct a second NL bot conversation with a second NL bot comprising one or more topics, e.g., comprising a second NL bot first conversation topic, a second NL bot second conversation topic, and the like. Any given point during a second NL bot conversation may be termed a second NL bot conversation datum.

For each user conversation (by way of one or more channels 20, e.g., voice, messaging, etc.), the orchestration manager 312 creates a unique session identifier and maintains (in memory of processor 321, in system database 323, e.g.) the state or status of important activities during the conversation. For example, the orchestration manager 312 maintains or tracks or stores the status (e.g., a conversation datum) and/or the context (e.g., the conversation topic) of each individual NL bot 331 throughout conversation.

The state may provide details of or describe the datum or location of the conversation between the user 11 and the NL bot 331 (e.g., user has asked a question of the NL bot 331). The context may include the conversation topic under discussion (e.g., a recurring billing problem, a problem accessing a customer care website). Thus, the orchestration manager 312 maintains and tracks where the user 11 is in a particular dialog with one or more NL bots 331 such that, among other things, a particular NL bot 331 is able to return, or remember, the location (datum) and context of a particular user conversation if and when the user 11 is re-engaged after a pause or other interruption in the conversation.

Stated another way, the orchestration manager 312 creates one or more NL bot identifiers associated with the one or more NL bots 331, such as a first NL bot identifier and a second NL bot identifier. The first NL bot may conduct a first NL bot conversation with a user 11 that generates a first NL bot conversation data stream, the first NL bot conversation data stream comprising one or more conversation topics. The first NL bot conversation data stream may comprise one or more conversation datums, such as a start datum, first pause datum, second pause datum, and end datum. Similarly, a second NL bot may conduct a second NL bot conversation with a user 11 that generates a second NL bot conversation data stream, the second NL bot conversation data stream comprising one or more conversation topics. The second NL bot conversation data stream may comprise one or more conversation datums, such as a start datum, first pause datum, second pause datum, and end datum. The orchestration manager 312 maintains and/or stores these data, e.g., the orchestration manager 312 identifies, maintains, and/or stores the data and data streams of each of the NL bots 331 of the set of NL bots 331, to include, e.g., the first NL bot conversation data stream and the second NL bot conversation data stream.

The orchestration manager 312 may orchestrate or share or manage interaction of the set of NL bots 331 with the user 11. For example, the orchestration manager 312 may share context between NL bots 331 so as to allow a secondary bot to take over where the first NL bot left off. Stated another way, the orchestration manager 312 may note or identify or be triggered by a first pause datum of a first NL bot conversation data stream, causing the orchestration manager 312 to engage a second NL bot to engage with the user 11 as a substitute for the first NL bot. The orchestration manager 312 shares or provides data generated from the first NL bot conversation with the user (up to the identified first NL bot datum) with the second bot (such data may include all or part of the first NL bot conversation data stream, e.g., conversation topics).

The orchestration manager 312 may record or publish, using processor 321 and/or system database 323, any or all of the data associated with user 11 interactions with the one or more NL bots 331. For example, these data may be used to generate the data analytics 157, performance monitoring 159, and/or data repositories 159 described above. The orchestration manager 312 may create separate conversation sessions associated with the conversation parities or character of the conversation. For example, the orchestration manager 312 may create and/or record a first conversation session between a user 11 and a first NL bot and create and/or record a second conversation session upon the addition of a second NL bot to the first conversation session.

In one embodiment, more than one NL bot 331 is engaged with a user 11 at a time. Note that the set of NL bots 331 may be any cognitive service application or component, to include natural language bots. In one embodiment, one or more of the set of NL bots 331 are natural language bots or callable of natural language bot functions, as known to those skilled in the art. In one embodiment, the orchestration bot is a natural language bot or callable of natural language bot functions, as known to those skilled in the art.

The orchestration manager 312 may comprise an orchestrator bot 340 which may operate to embed with the one or more NL bots 331 into a particular conversation with a user 11. For example, the orchestrator bot 340 may embed into a user 11 conversation at the beginning of a conversation (e.g., start of web chat), or may be brought into the conversation at the middle of conversation (e.g., when call arrives to an agent). Either way, a new session may be created by the orchestration manager 312 as triggered by the entry of the orchestrator bot 340. As such, the orchestration manager 312 may mix and match a set of selectable NL bots 331 to create a unique and tuned conversation session with a user 11.

The orchestration manager 312 also comprises the Conversation Control Language (CCL) 315 module. CCL 315 defines how conversation is normalized across bots to include NL bots 331 and orchestration bot 340, channels 20 and various message types such as text, cards, rich media, etc. Customers (aka user 11) may be interacting on different channels 20, e.g., voice, social, SMS, web chat, etc. In a conventional system 10, typically each channel 20 has limits on the type of messaging that is supported. For example, one cannot share carousel card on SMS, or one cannot present buttons on a voice conversation.

CCL 315 provides a normalization or standardization such that regardless of channel 20 or bot one is integrating, one is speaking one unified or standardized language. Such a normalization part of the Orchestrator 310 allows one to have an abstract language that works across many bot vendors and channels. Stated another way, the CCL 315 enables the orchestration manager 312 to receive disparate channel set input data 311A from the one or more channels 21-26 of the channel set 20 and create or output channel set standardized data 311B. For example, the orchestration manager 312, by way of the CCL 315, may receive a first channel data stream of a first channel protocol and create a standardized protocol first channel data stream of a standardized protocol from the first channel data stream. Similarly, the orchestration manager 312, by way of the CCL 315, may receive a second channel data stream of a second channel protocol and create a standardized protocol second channel data stream of a standardized protocol from the second channel data stream. The first channel protocol may be different than the second channel protocol.

The Conversation Control Language 315 defines a set of open standard file format and data interchange formats. In one embodiment, the CCL 315 defines a set of JSON structured control responses that are returned from synchronous Bot/AI dialogue nodes invocations. (JSON means JavaScript Object Notation). Authors of AI conversations may leverage these control responses to enhance the conversation flow beyond simple text messaging between the end user and a Bot. A set of common control responses are defined that will be supported by all of the end user channels, additionally there will be channel specific response messages defined so that conversation authors can take advantage of channel specific features (Facebook, Slack, etc. . . . )

The top level "response" node in the structure is required. Below the response node may be one or more channel specific sections. These sections may include 'common' as well as other channel types such as 'mobile', 'facebook', 'slack', etc. Channel sections will contain an array of response type maps. If multiple response type maps are present, they will represent an ordered sequence and each type of map will be translated and sent to the channel client in order. The following is an example response that a contains a text message as well as an inline image to be sent to the channel client.

Example or common response types handled by the CCL include: text, file, pause, action, option, channel escalation. Each response type has a defined structure.

A text response types may mean a text message to the channel client. FIXME: The text may contain Markdown (https://en.wikipedia.org/wiki/Markdown) encoding that will be translated to channel specific support. A file response type may mean an indication to the channel client that a file is available for download. A pause response type may mean a time in milliseconds to pause before sending the next response type. An action response type may mean a display of a button a channel user can click to take an action. The specified value attribute of the options is then sent as the user response.

An option response type may mean a display of a set of buttons a channel user can click to choose an option. The specified value attribute of the options is then sent as the user response A channel escalation response option may mean providing a list of available channel escalation options to a channel client. Based on the user selection the 'value' data section for the escalation should be sent back by the channel client.

The orchestration manager 312 supports or is configured to operate with each of voice channel 26 and chat channel 21 inputs and may be tuned or configured to operate with Associate Assist use cases. Voice channel 26 may be based on telephony hardware and CTI integration which may require two services within the system 300.

CTI Service 313 enables the orchestration manager 312 to understand about call events, when a call has arrived at an agent, if the call is on hold, transferred, or if call has ended, for example. Such events help orchestration manager 312 maintain unique session and to know when to bring in a particular NL bot 331 bot or remove a particular NL bot 331 a user 11 conversation.

Media Gateway 313 provides real-time voice to text transcription. Combined with CTI service 313, the orchestration manager 312 is able to know of call events and what is being spoken in the conversation (between a user 11 and one or more NL bots 331). The individual utterance from caller and agent data is used to process natural language understanding, which typically can result into a suggestion to the agent.

Using above CTI events and text transcript of real-time voice, the orchestration manager 312 engages a particular NL bot 331 and is able to offer various cards/recommendations to the agent. The real-time CTI events and recommendations derived from transcribed utterances are then published by the orchestration manager 312 through message queue and downstream to a particular application or use case, such as the Associate Assist application.

The orchestration manager 312 supports IVA (Customer Assist) for all channels as defined by Conversation Gateway 311 channel support. In addition, orchestration manager 312 also offers REST API to directly invoke Orchestrator flow which may contain NLU bot(s). This is especially useful when one seeks to take voice conversation and seeks a way to introduce the orchestration manager 312 as a bot into the conversation (meaning introduce the orchestration bot 340).

The Customer Assist use case typically means that orchestration bot 340 has been introduced into the conversation from the beginning when the customer-initiated conversation on the channel. The self-service experience can be customized with one or more NLU bot or nodes that are available in the canvas. The canvas also includes escalation nodes which provide escalation to various flavors of ACD platforms (e.g., Cisco UpstreamWorks, Cisco ECE, etc.). This is helpful when a particular NL bot 331 determines it is no longer able to assist the customer and the conversation needs to be transferred to a live human agent. The orchestration bot 340 is able to understand when a NL bot 331 detects escalation intent (using CCL) and is able to escalate the conversation to a live agent. Since orchestration bot 340 is in middle of the conversation, one is easily able to shift conversation between customer and bot, to customer and live-agent. As the orchestration bot 340 is embedded into the conversation, a customer assist use case can then shift over to associate assist use case where we start making recommendations to the agent as the system 300 listens or monitors the chat conversation.

The conversation gateway 311 allows the system 300 to front conversation channels (any of channels 20) where customers (aka a user 11) will begin their conversation journey. Conversation gateway 311 helps deploy these channels, customize the channel behavior, and normalize conversations into the CCL 315.

The communication channels 20 may include Web Chat 21, SMS 22 (via Twilio), and Facebook Messenger. Such channel clients are universal because with the system 300 one is able to customize bot and escalation experience regardless of channel 20. For example, one may decide to deploy web chat for a customer that integrates with two bots 331 and later escalates to Cisco UpstreamWorks. For another customer, one could deploy a single bot 331 that escalates to Cisco ECE. Regardless of bot or escalation, the client is the same and is customizable.

The communication gateway (CG) 311 also helps establish a session with the Orchestrator 312 and relay's messages back and forth between customer and bot or agent. CG 311 may take a user's 11 input and raw message from a particular channel 20 and transform it such that it may be sent to the orchestrator manager 312. In response, from the orchestrator manager 312, one may receive a CCL 315 message which the CG 311 interprets according to the channel and how the channel supports the message types.

In addition to standard text-based messaging, CG 311 is also able to interpret non-message based events such as typing indicators, browser events, agent activity events. All of these events are appropriately routed to the channel client or to Orchestrator so they can reach the live agent.

CTI service 313 is responsible for connecting to ACD platform and subscribing for call CTI events of various call activities. The call events are received, transformed and forwarded to the Orchestrator service so that the Orchestrator 312 may maintain its own session state of active calls. The Orchestrator may use these call events (e.g., Cisco CallEstablished and CallCleared) to understand when the call has arrived at an agent, or if call has terminated. These events give the orchestrator manager 312 the signal to bring in the bot to assist the agent and terminate the session/bot when call has ended. Orchestrator also uses these events to notify the agent using Associate Assist UI that a call has arrived or ended.

The Media Gateway 313 is responsible for receiving SIP/RTP forked media stream coming from the SBC and transcribing both customer and agent RTP audio via Speech-To-Text engine. The RTP to text transcription is done in real-time, per individual party in the conversation. The Media Gateway integrates with third party speech to text services such as (Google STT or alternative third party speech to text vendor) to handle the transcription. The resulting real-time transcription text is then delivered to the orchestration manager 312 where the orchestration manager 312 is able to associate caller's session via CTI service to piece together call events along with utterances.

The system database 323 stores all conversation sessions that are processed through the system 300. The system database 323 is responsible for logging all requests, orchestrator canvas nodes that were invoked and their outcome as the bot responded by back to user. These data are valuable for historical reporting, real-time dashboards, and NLU based data analysis that occurs in real-time. The data are also available to drive or enable one or more of data analytics 157 and performance monitoring 158.

In one embodiment, the system database 323 is any commercially available relational database, to include free any open-source relational database systems known to those skilled in the art, such as the Postgre SQL aka Postgres database system.

The system database 323 may include one or more of the following tables: device, session, session history, and orchestrator.

The device table of the system database captures a customer's device and channel in which they are interacting from. For inbound voice call one expects to observe customer ANI (unique phone number) or for web chat a unique identifier and optionally customers account number. With data related to each user, one is able to understand returning users or new users.

The session table of the system database captures each individual session created on the Orchestrator. Every conversation has a unique session identifier where one may keep track of length of conversation, status of the session, how conversation arrived, or how the conversation resolved, for example.

The session history table of the system database captures individual events that occurs on the Orchestrator. For AA voice, this could be when call arrived to agent, followed by individual transcribed utterance between customer and agent, then followed by call end event when the call terminated. Each session identifier or identification typically has many entries to capture the conversation events.

The orchestrator table of the system database captures how the Orchestrator processed each utterance/message from the customer or agent. Here one may observe how a particular message was processed through Orchestrator flow and nodes that were executed in the canvas.

The associate assist (AA) app 322 is backend application that proxies messaging between Orchestrator and AA UI 323. It also helps support authentication of users logging into any of the UI based applications.

The AA app 322 (developed using GraphQL technology) allows one to publish only relevant information down to the UI. On startup, AA app subscribes to message queue and waits for events to arrive as they are published from Orchestrator. Any of the Orchestrator events (call events, suggested card events, transcript event), are all picked up from the message queue and AA app delivers it downstream to UI using GraphQL. For all users accessing AA UI (user interface) 323, one is first authenticated through AA app 322. Once authorized, the application is able to communicate back and forth to receive events and call APIs.

The Associate Assist UI 323 comprises Associate Assist UI (the interface used by contact center agents to receive recommended answers and other cards), Supervisor Dashboard (the interface used by contact center supervisor to monitor all agents and their interactions in real-time), and Admin (the interface used by cognitive developers, business analysts to configure and train the bot).

Both AA UI and Supervisor Dashboard primarily run in "listening mode" in that the application subscribes and waits to receive events. These events can be form of call activities (Call arrived to agent, call ended, etc.), transcript (live utterances as they are transcribed), or form of suggested cards (cards presented to the agent based on processing of utterance, typically with NLU bot).

The orchestration editor 330 is a drag-and-drop interface which allows cognitive developer to customize AI bot experience. In the orchestration editor 330 a canvas is provided which is grouped into following categories: Cognitive (AI cognitive integration nodes, e.g., Google DialogFlow, Rulai, etc.). Watson AI (Watson AI services integrations nodes, e.g. Watson Assistant, Discovery, etc.), Channel In (various ways interactions such as voice and chat can enter Orchestrator), Channel Out (Various ways interaction data can be sent out to UI and services), Processing (Nodes which assist in processing data as we orchestrate interactions), services (nodes which provide external integrations, typically non-AI related such as CRM, KMS, etc.), and subflows (provide re-usable flows that can be used across various interaction scenarios). The following nodes provide a developer with deeper level coding support to meet client's requirements: Input, Output, Function, Advanced, Storage, and Social. In one embodiment, the orchestration editor 330 provides assistance in managing orchestration manager 312, e.g., the orchestration editor 330 may manage and/or handle the flow of NLU bots, cognitive services, and/or automation.

With attention to the associate assist application or use case, “cards” may be employed which serve to assist the user 11 agent. A card may be presented via a UI top an agent. A particular card may be generated by one or more NL bots 331 and/or the orchestration bot 312. The cards may be of any of several types, to include a suggested answer card, a next best action card, a real-time script card, and an interaction summary card.

A suggested answer card provides a recommended answer based on a customer’s (user 11) intent determined by a NL bot 331 or by an FAQ (frequently asked questions) knowledge source. The suggested answers may also contain relevant knowledge article links.

A next best action card provides a recommendation on actions such as the transfer the interaction (e.g., to another NL bot or to a human agent via escalation) or may recommend an RDA bot accessed via a desktop action on a user interface.

A real-time script card may provide a checklist of items that an agent must ask the caller (user 11) for compliance/adherence requirements. As the agent speaks to the system 300, the system 300 listens to and identifies the agent’s intent and checks off the list in real-time. When the checklist is completed, the card is moved to completed state.

An interaction summary card provides a summary of the entire conversation after the conversation has ended. The following elements may be provided as a part of the interaction summary card: matched intents (all customers intents that were matched during the call), keywords (important keywords spoken by the customer), sentiment (overall sentiment of the conversation) and transcript summary (the transcript is summarized using machine learning to reduce overall transcript reading length down to 25-30%).

The orchestration manager 312 with regards to the AA use case may also provide these features: real-time transcripts, knowledge search, and context pills. Real-time transcripts provide a transcription of the voice conversation between a customer and an agent. The transcript may be copied and placed into external systems such as the CRM. A knowledge search allows an agent to ask a bot a question via a search input. In such a query one may surface relevant suggested answers or matching articles. A context pills provides important context information picked up or identified by the associate assist which is presented to the agent.

Other functions include a System Administrator 324 which provides a response builder and a speech to text tool (aka a call simulator). The response builder is a centralized managed bot response so that a business analyst can quickly update a suggested answer, without requiring knowledge of cognitive bots or having access to them. The speech to text tool is used to simulate a live call between a customer and an agent through a web browser. The System Administrator 324 manages and provides all administration functions of system configurations or use application, to include customer assist and associate (aka agent) assist.

A Supervisor Dashboard 325 aids the supervisor with a live view of the contact center on the live topics being discussed by the agents and caller. The supervisor has the ability to view following for each agent items including: a live transcript (customer and agent utterance as it is spoken), topis (customers’ intent(s) as bot detects them using NLU), and sentiment (the live sentiment of the customer).

With attention to the customer assist application or use case, the orchestration manager 312 may also support both of SMS and web chat, and provide web chat client customizations, i.e., web chat client that is fully customizable in look and feel. In one embodiment, SMS and/or web chat customizations are handled by System Administrator 324. Examples of some elements that may be customized are: floating Chat Icon/Bubble (image, location, width, pop-up, etc.), chat header (icon, title, background, font), chat window (chat window-height, width, location, shadow, radius, color, width, font), chat panel (font, bot bubble font/color, user bubble font/color, agent bubble font/color, system bubble font/color, send Icon, Background color, placeholder options), greeting text, delay, show/hide, and send button (background color, font, border, hover).

Figure 4:
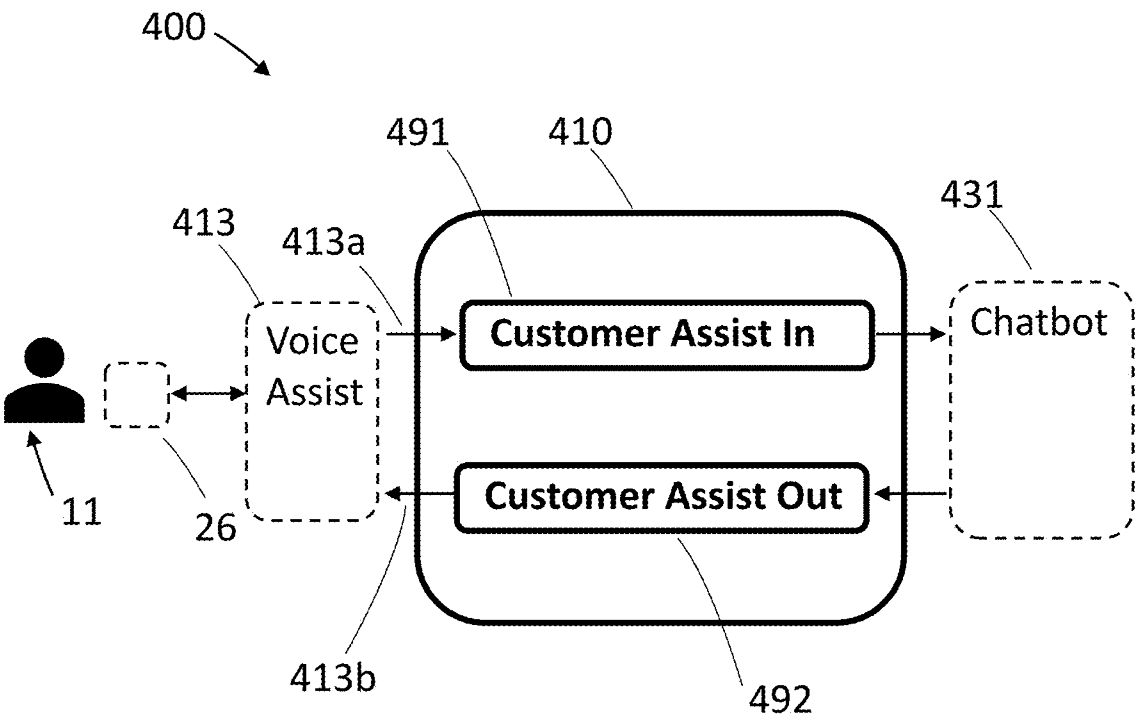
FIG. 4 is a schematic diagram of particular implementation aspects of the intelligent systems orchestration system of FIG. 2, as implemented for a customer assist application.

FIG. 4 is a schematic diagram of particular implementation aspects of the intelligent systems orchestration system of FIG. 2, as implemented for a customer assist application. The intelligent systems orchestration system 400 of FIG. 4 may be referred to as system 400. The system 400 comprises a voice assist 413 component which interacts with voice input from voice channel 26, as provided by user 11, a customer assist in 491 module, and a customer assist out 492 module. Each of customer assist in 491 module and customer assist out 492 modules interact with chatbot 431. Voice channel 26 is one of a channel set 20, as described in FIGS. 1 and 2 above. Voice assist 413 receives voice channel output from channel 26 and sends or outputs to voice channel 26. Voice assist 413, after processing of input data stream from voice channel 26, sends data stream 413A to the customer assist in 491 module. The voice assist 413 module receives a data stream 413B from the customer assist out 492 module. Generally, a customer user 11 calls into the system 400, and interacts with chatbot 431 by way of the system components 400, to include voice assist 413 module.

Note that the Customer Assist application or user case is a way to empower customers to self-service without having to speak to a live-human agent. This is very powerful because these assistants (chat bots) may be available 24/7 and provide seamless support experience. In an event the assistant bot is unable to service the customer, there is ability for the bot to escalate the interaction to a live-human agent.

Any of the disclosed intelligent systems orchestration systems, to include system 400, may integrate with or leverage a set or plurality of channels 20 and/or cognitive services 30. In one embodiment, the voice assist 413 module is provided by Cisco. In one embodiment, the chatbot 431 is a product by Dialogflow or any other enterprise conversational computing platform known to those skilled in the art.

Voice assist 413 handles all voice components (e.g., Speech-to-text and Text-to-speech) and interacts with the orchestration system engine 410 through each of the customer assist in 491 module and customer assist out 492 modules. Voice assist 413 handles all inbound voice channels, including CTI, routing and also converting customers spoken speech into text (in one embodiment, using Google’s speech to text). Once speech is converted into text, Voice assist 413 interacts directly with the orchestration system engine 410 using REST API calls. (REST means representational state transfer architectural style; other API styles or protocols may be used, as known to those skilled in the art). The data stream or interaction from voice assist 413 and customer assist in is data stream 413A. The orchestration system engine 410 is responsible for making the AI decisions such as invoking the chatbot 431. The response from the orchestration system engine 410, such as from the chatbot 431, is returned back to the voice assist 413 in data stream 413*b*. The voice assist 413 then in turn will take the data stream 413*b* data and either speak back to the customer 11 using text to speech or perform an action instructed by the chatbot 431 such as escalating or ending the call.

As identified above, the orchestration system engine 410 comprises the customer assist in 410 module (aka the customer assist node 410) which exposes REST API endpoints that may be invoked by voice assist 413. The customer assist module 410 or node new node is responsible for creating and setting up a new session on or via the orchestration system engine 410 (including session in-memory details, database table build-out's). The customer assist module 410 is responsible for processing inbound utterances (spoken words by the customer 11) and sending these down the orchestration system engine 410 flow so that these data may be processed by chatbot 431. The outcome of the chatbot 431 is sent to voice assist 413 as an HTTP response.

The data stream 413*a* provided by the voice assist 413 and received by the customer assist in 410 may include: create session, send message, and end session packets or instructions.

Upon receipt by customer assist in 491 of data stream 413*a* (e.g., customer utterances aka messages) from the voice assist 413, the customer assist in 491 passes data associated with the data stream 413*a* to the chatbot 431, which triggers the chatbot 431 to respond and/or take some action.

In reference to an incoming "send message" instruction or packet in data stream 413*a*, the result taken by the system 400 may include an output type, a context type, and an action type.

An output type is used by the voice assist 413 to determine how the chatbot 413 should respond to customer 11. Similar to Associate Assist, the conversation control language module described above is employed, which defines an array of instructions coming from the chatbot 431. For example, the chatbot 431 could instruction the voice assist 413 to speak some text. In a more complex example, the chatbot 413 may instruct the voice assist 413 to speak some text, followed by pause for 2 seconds, then followed by another text which needs to be spoken. The CCL object may be defined in the chatbot 431 and passed on as utterances that require instructions. The orchestration engine 410 is responsible for ensuring that response (an HTTP response) contains CCL under output object.

A context type helps the chatbot 431 remember what's occurred in the conversation. This context may be set by either the voice assist 413 or the chatbot 431 and it helps the chatbot 431 to make decisions or to derive appropriate dialog/response. The context type is basically passed around and managed by either parties (the chatbot 413 and the voice assist 413). The orchestration engine 410 is responsible to ensure that the context is cached into Orchestrator Redis and passed back to the voice assist 413 as an HTTP response.

The action type helps the orchestration engine 410 give instructions to voice assist 413 that are typically non conversational. For example, the chatbot 431 may determine it is no longer able to assist to customer 11 and needs to escalate the conversation to a human agent. In this case the chatbot 431 will define an escalate action that instructs voice assist 413 to escalate the call. Another case may be where both customer 11 and the chatbot 431 have completed all tasks and the call must be terminated. In this case, the chatbot 413 instructs the voice assist 413 to hang-up the call (hand-up is the action or instruction). Such instructions are output or generated by the chatbot 431. The orchestration engine 410 has responsibility to ensure all such action types are set and forwarded or directed from the chatbot 431 and back to the voice assist 413 via an HTTP response.

The customer assist in 491 module or node exposes API endpoints and processes the API endpoints to establish a session on or by way of the orchestration system engine 410, and also logs or records the inbound events. Also, the customer assist in 491 module or node internally exposes endpoints.

The chatbot 431 or chatbot node may support either or both of Associate Assist and Customer Assist use cases. For Customer Assist use cases, chatbot 431 handles processing outputs from a Customer Assist node and calls the chatbot 431 based on customer assist event type. The request/response from chatbot 431 are transformed to adhere to Customer Assist API and CCL guidelines. The customer assist out 492 module or node sends HTTP response back to voice assist 413. The orchestration engine 410 defines a set of REST APIs that may be invoked by voice assist 413.

Figure 5A:
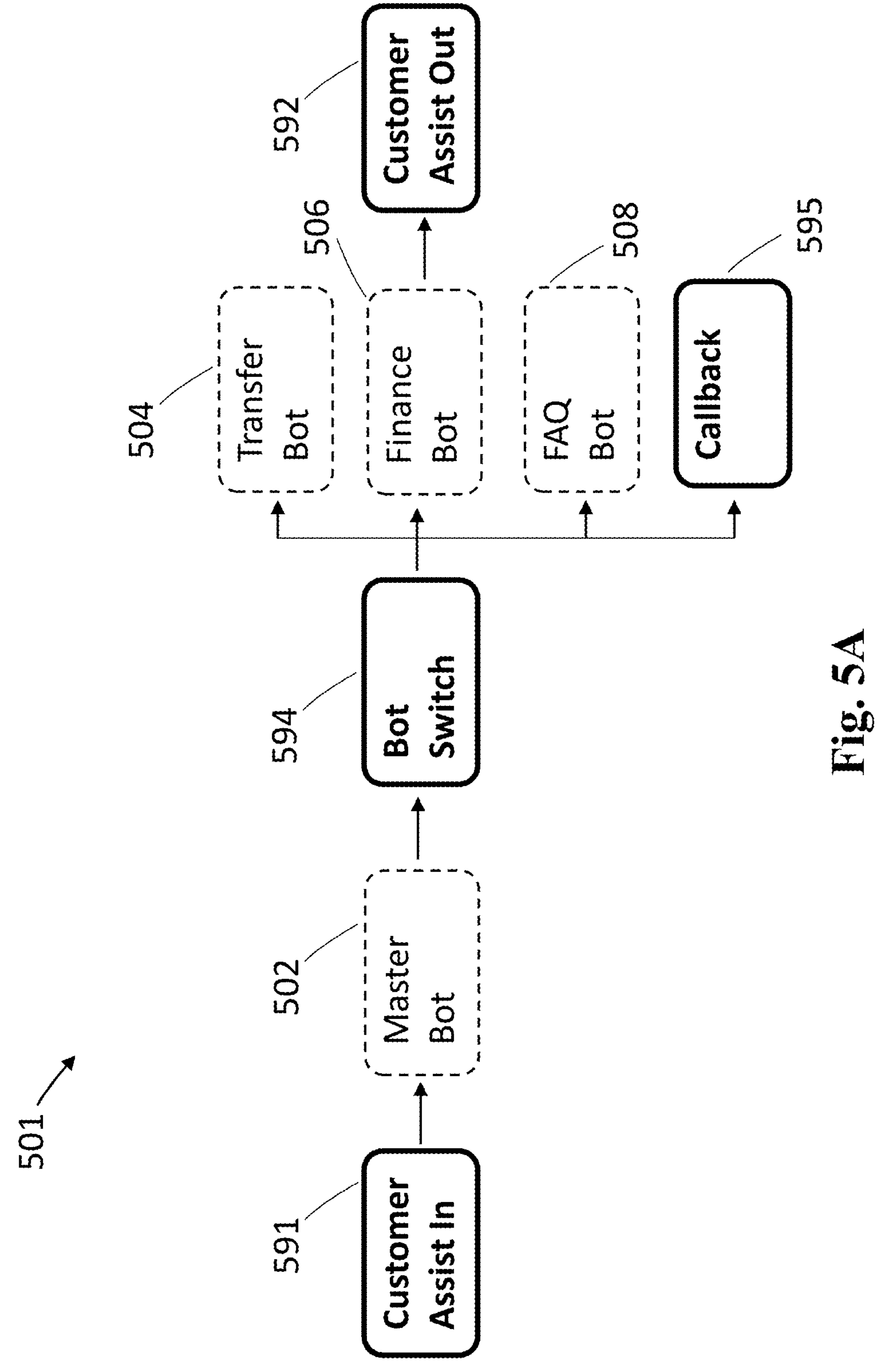
FIG. 5A is a schematic diagram a router pattern implementation of the intelligent systems orchestration system of FIG. 2, as implemented for a customer assist application.
Figure 5B:
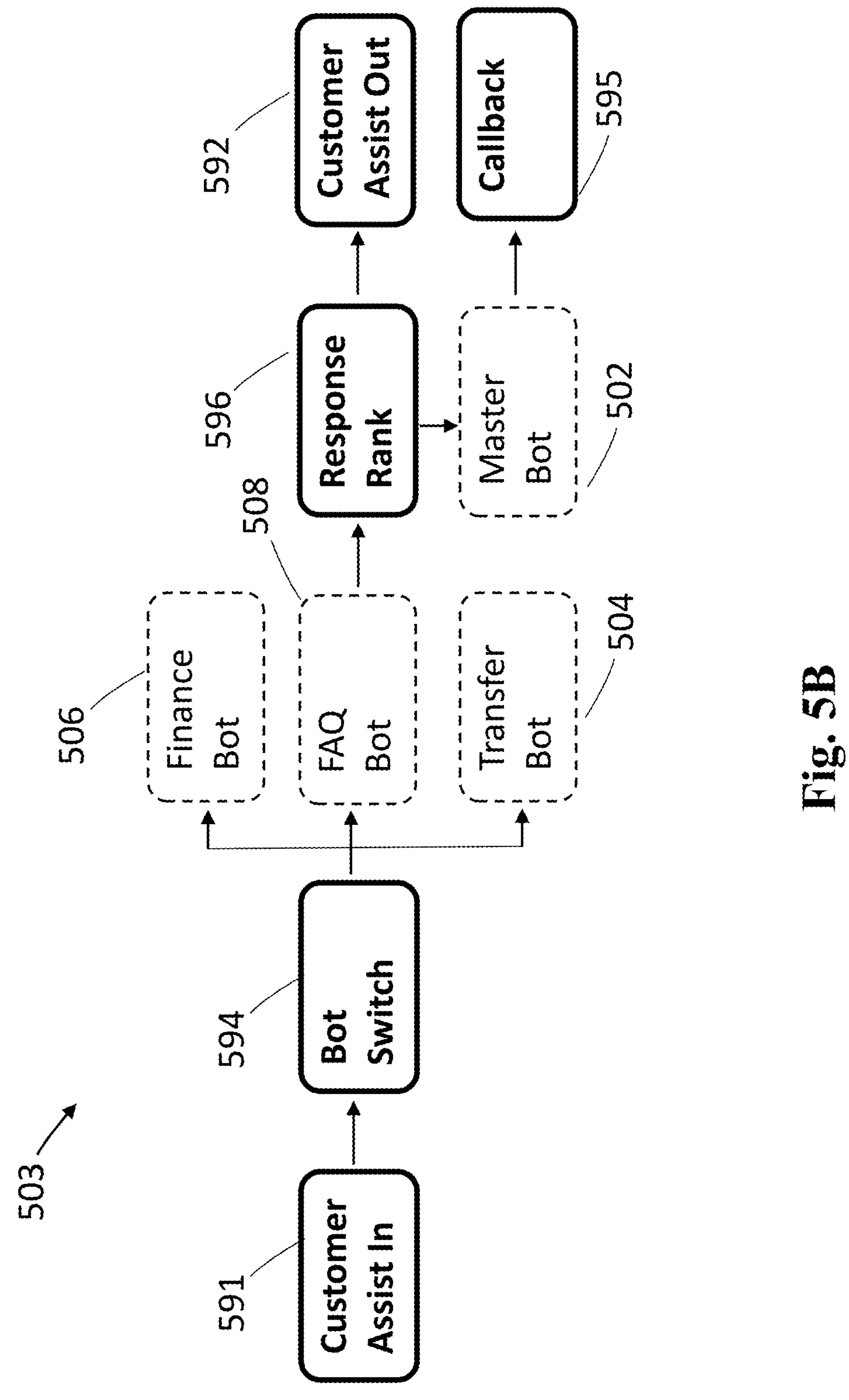
FIG. 5B is a schematic diagram a sprinkler pattern implementation of the intelligent systems orchestration system of FIG. 2.

FIGS. 5A-B each present two embodiments of implementation aspects of the intelligent systems orchestration system of FIG. 2 for a customer assist application. The intelligent systems orchestration system 501 of FIG. 5A uses a router pattern implementation and may be referred to as system 5A. The intelligent systems orchestration system 503 of FIG. 5B uses a sprinkler pattern implementation and may be referred to as system 5B.

In system 501 of FIG. 5A, a customer assist in 591 module, similar in operation and features to that of the customer assist in 491 module of FIG. 4, outputs to a master bot 502. In one embodiment, the master bot is Watson Assistant. The master bot 502 routes based on intents, entities, and/or context, each of intents, entities, and context as described above. The master bot 502 outputs to bot switch 594, which maintains context for all bots of the system 501, where context is as described above. The context may be shared with and/or among all or some of transfer bot 504, finance bot 506, FAQ bot 508, and/or Callback 595 module. Callback module 595 may include a return call to the user or customer, and/or escalation. In one embodiment, the transfer bot 504 is Watson Assistant. In one embodiment, finance bot 506 is Kasisto. In one embodiment, FAQ bot 508 is DialogFlow. The finance bot 506 outputs to the customer assist out 592.

The customer assist out 592 is similar in operation and features to that of the customer assist out 492 module of FIG. 4. Customer assist out 592 may produce final CCL (Conversation Control Language) response(s); regardless of which bot(s) were invoked, a final CCL is produced by Orchestrator and sent to the user client (e.g., web chat, voice) for interpretation for that channel.

The master bot 502 and bot switch 594 may use an initial bot conversation with the customer to establish their initial intent. The Bot Switch 594 may then in turn use that intent to proxy the conversation to a specify functional bot where the conversation continues. In other words, the initial customer intent is used to select/route the conversation to the appropriate functional bot.

System 503 of FIG. 5B is similar to system 501 of FIG. 5A in that it shares many components or modules yet differs in the arrangement of several of those modules. In system 503, a customer assist in 591 module, similar in operation and features to that of the customer assist in 491 module of FIG. 4, outputs to a bot switch 594. The bot switch 594 provides a call out to all bots (finance bot 506, FAQ bot 508, and transfer bot 504) in an open dialog turn. The bot switch 594 continues to keep dialogue or conversation data flowing to each of the three bots 506, 508, 504 until selection is made (via response rank 506 module) and/or control is handed off to another module of the system 503. Each of the finance bot

506, FAQ bot 508, and transfer bot 504 provide a response (based on the input received from the customer assist in 591 by way of bot switch 594) to the response rank 596 module. The response rank module 596 considers the set of responses from each of finance bot 506, FAQ bot 508, and transfer bot 504 and selects the best response, based on, for example, an intent confidence score, response availability, and context. The selected response is provided to the customer assist out 592 module (similar in operation and features to customer assist out 492 module of FIG. 4).

The response rank 596 module also provides the selected bot response top master bot 502 which in turn outputs to callback 595 module. Each Bot NLU engine has the capability of determine a confidence score that indicates how well an utterance matched to an intent. The score is usually between 0 and 100 with 100 being a perfect match. The response rank 596 and master bot 502 may use this score to filter and return the response with the highest score or take an alternative action (e.g., offer callback or escalate to agent) if all three scores are low.

The customer contact center adherence and compliance system (aka the "adherence and compliance system") is described with reference to FIGS. 6-10.

Generally, the adherence and compliance system assists contact center agents and supervisors using Artificial Intelligence (AI). A series of workflows and checklists ensure each agent is following adherence/compliance guidelines. The AI engine listens to both customer and agents' utterances and uses generative AI's natural language understanding to identify what is spoken contextually to "check off" requirements for agents call compliance guidelines. A progress indicator of the checklist ensures that the agent is progressing through the call without missing compliance requirements. The expectation is that by the end of the call, all compliance requirements have been followed and met. To help guide the agent, a series of recommendations/instructions are also provided based on customers' topics being spoken, in real-time. With the overall progress indicator, the agent can feel at case knowing they are not missing any critical guidelines.

Figure 6:
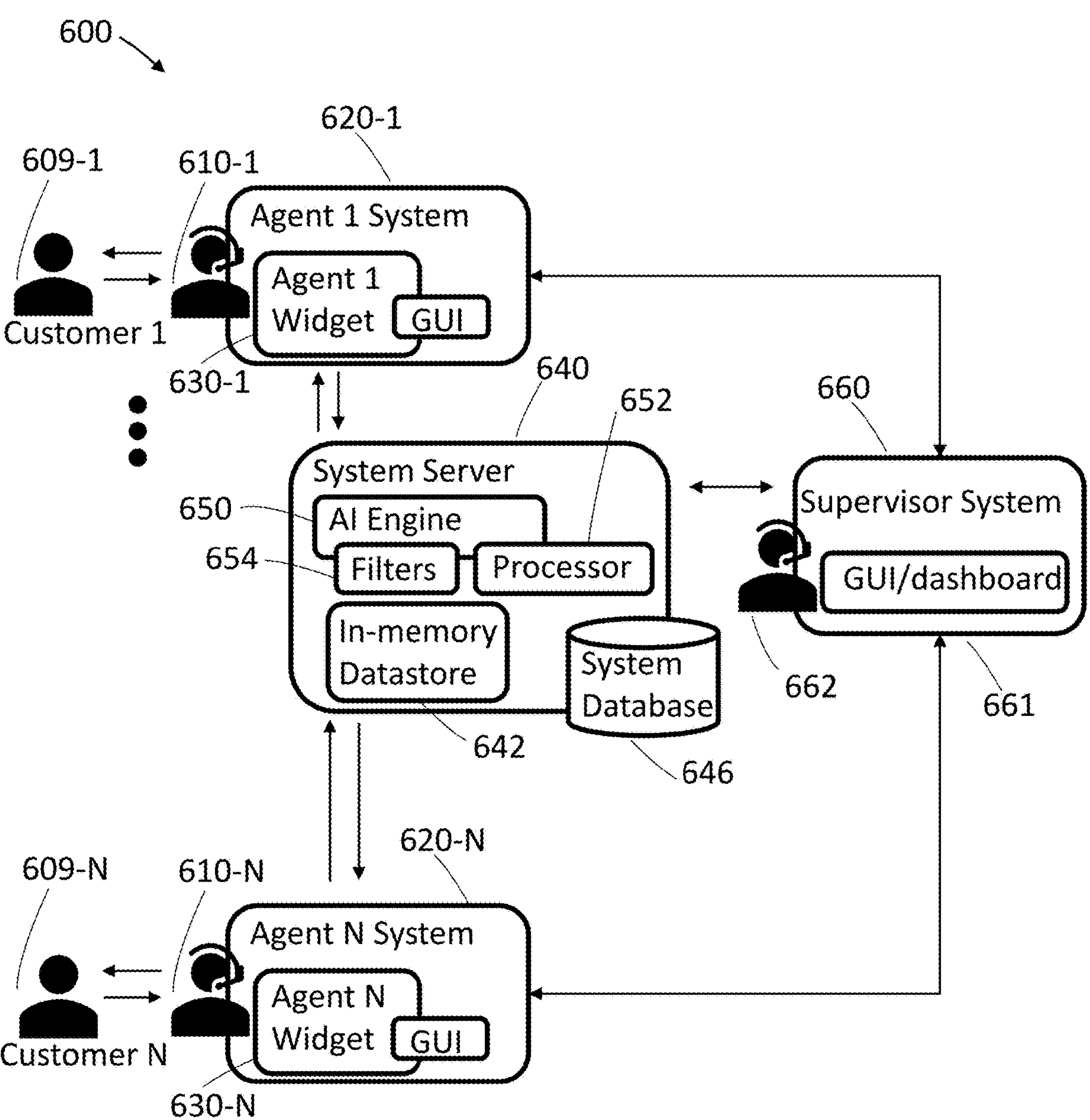
FIG. 6 is a schematic diagram of one embodiment of an adherence and compliance system of the disclosure.

FIG. 6 provides a schematic diagram of one embodiment of an adherence and compliance system 600. The adherence and compliance system 600 comprises a set of agent systems 610-1 through 620-N, a system server 640, and a supervisor system 660.

The adherence and compliance system 600 is focused on adherence and compliance checklists to ensure a particular agent has uttered specific questions or phrases. Each line of business or call types may be provisioned to set of workflow and rules which in turn guide agent through the checklist steps to ensure agent is meeting adherence and compliance requirements set forth by the business. Additional feature capabilities include suggested answers and articles, live transcription, call summarization, and PII masking.

The set of agent systems 610-1 through 620-N each comprise a respective agent widget 630-1 through 630-N. Each widget comprises a GUI (not shown). Each agent system is operated by an agent, e.g., agent system 620-1 is operated by agent 610-1 who interacts with customer 609-1, through agent system 620-N operated by agent 610-N who interacts with customer 609-N. The interactions will typically include communications of CTI Service (CTI means computer telephony integration) and media gateway (Sec FIG. 8).

The system server 640 communicates with each of the agent systems 610-1 through 620-N and the supervisor system 660. The system server 640 comprises AI engine 650, in-memory datastore 642, and system database 646. The AI engine 650 comprises filters 654 and processor 652. The in-memory datastore 642 contains or stores a set of compliance guidelines, such guidelines are selectable and are maintained or mapped to, e.g., agent-customer scenarios and/or session topics. Stated another way, the in-memory datastore houses checkpoint evaluation criteria in memory and real-time session data, for example. The compliance guidelines comprise a set of session guideline tasks, such tasks presented to a particular agent via agent widget. In one embodiment, the in-memory datastore is a Redis in-memory datastore or similar datastore. The system database may store outcomes of historical sessions and completed evaluations.

The system server maintains adherence to agent tracking to a checklist. The check-list feature of the system server listens to the agent conversation and ensures proper quality and compliance metrics are met. The application autocompletes the checkbox, or optionally agent can manually complete if AI has not properly identified the check. The purpose is to ensure agents are following process outlines by specific call type to complete adherence and compliance requirements. The checklist may be deployed in one of two modes, either sequential or non-sequential. Sequential assumes that the agent must follow the process and corresponding steps in a sequential ordered fashion. The agent is required to complete the steps prior to moving onto the next stage of the workflow. Non-sequential, however, does not force the agent to follow workflow in order. The agent may utter steps from any point in the process and AI will listen and check the step.

The system server may offer suggested answers and articles. The suggested answers are well defined answers for a given question that are presented to the live agent when a customer uttered the question. The system server may also provide a live transcription of an active call to the agent. This is an easy way for an agent to reference the conversation at any point during the conversation. Also, a summarization may be provided to the live agent after a call ends. This enables a short summary which may be reviewed, or transferred to customers CRM. The summarization includes top topics, keywords, sentiment, if the agent resolved customer's inquiry, action items an agent needs to peruse after the call, transfer notes if a call is transferred, along with short readable summary of the call transcript. A PII masking feature enables masking of sensitive PII data in real-time. The transcript containing PII data will appear masked to the live agent and persisted in database with masking to ensure PII is not persisted at rest.

The supervisor system 660 comprises GUI/dashboard 661 and is operated by supervisor 662. A Supervisor Dashboard (see FIG. 9) provides visibility into agents with AI enhancements allowing supervisor to provide immediate feedback to agent. The supervisor may gain real-time understanding of calls such as sentiment of the conversation, the topic being discussed, and monitor the live transcriptions. The supervisor dashboard provides a means to monitor agents' activity as extension to contact center monitoring tools. It provides real-time AI metrics for calls such as sentiment analysis, topic detection, live transcriptions, and more.

The supervisor dashboard of the supervisor system 660 is an extension to the system server 640 ability to real-time analyze live calls. Upon supervisor's login to Dashboard console, the UI will authenticate and subscribe for all events applicable for all agents under the supervisor. This provides a consolidated view of all the agents including agent's name, current login status into the system 600, if agents are actively on a call, and all the AI based calculations performed on the call. These include live transcription, topics being discussed on the call, sentiment of the call, and current step of the checklist.

Each of the agent systems, such as first agent system 610-1, is configured to: i) communicate with a first customer 609-1 in a first session, ii) create first session data comprising first session data utterances, and iii) render a first session display associated with the first session data. The first session data may comprise data by way of CTI service and media gateway. These data are communicated to or with the system server essentially or purely in real-time.

The system server 640 comprises a comprising a computer processor 652 configured to: i) receive the session data from each agent system, ii) assess the session data utterances against the session compliance guidelines (for a particular agent system) to determine a session status and a session compliance, and iii) identify one or more corrective actions if the session compliance is negative. The computer processor 652 operates to determine a particular agent system session status by assessing the utterance data, the session status comprising a completion status of the set of first session guideline tasks. The computer processor 652 may also operate to determine session compliance and communicate that compliance status to each of the first agent system and the supervisor system. Furthermore, the computer processor 652, if a session compliance is negative, may identify one or more corrective actions and communicate the corrective action(s) to the agent and/or agent system.

The supervisor system 660 is configured to: i) receive the each of the agent system session data (either directly from each agent system on by way of system server) and ii) to receive the session status and the session compliance data for each of the agent systems from the system server 640.

Each agent widget operates first to authenticate the agent user. The widget comprises the following UI components: Article Component, No-Page Component, Call-Transcript & Call-List Components, Session-Expired Component, Call-Summary Component, Container Component, Logout Component, and CSV-Upload Component.

The system database 646 stores conversation record history and all the outcomes from AI processing such as Checklist, Summary, and transcriptions.

Figure 7:
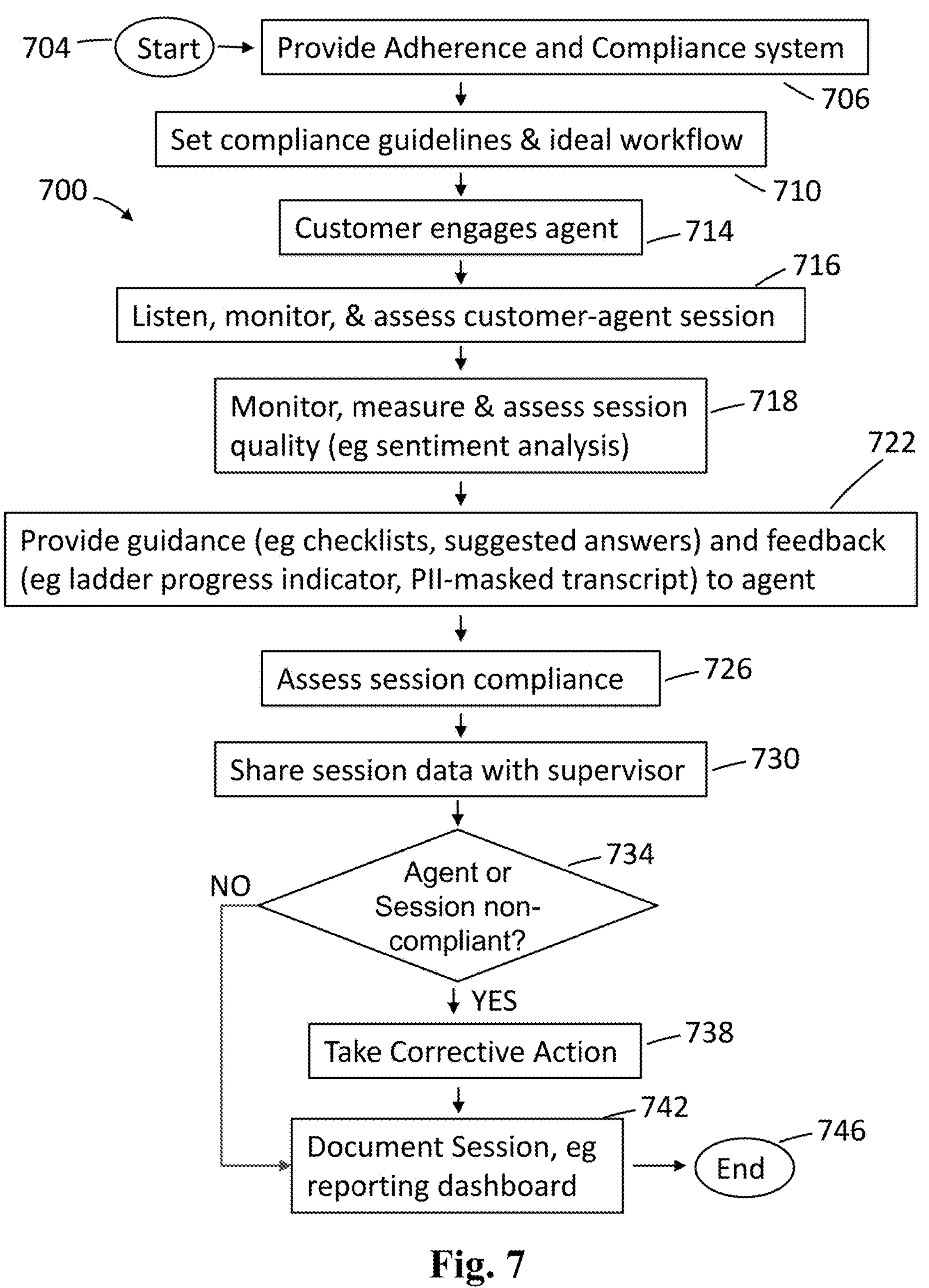
FIG. 7 is a flow chart of one method of use of the adherence and compliance system of FIG. 6.

FIG. 7 is a flow chart of one method of use 700 of the adherence and compliance system 600 of FIG. 6. Note that in some embodiments, some functions (e.g., any of the identified elements numbered 710-742) may be absent, occur in a different order, or include other functions or steps not shown. A method of use 700 depicted in FIG. 7 will now be described, with reference to aspects and features of the system of FIG. 6 described above.

After starting at step 704, the method 700 proceeds to step 706. At step 706, the adherence and compliance system is provided, such as that described in FIG. 6. After completing step 706, the method 700 proceeds to step 710.

At step 710, a user (such as a system administrator) sets compliance guidelines and ideal workflow schemes. Such settings may be session or event specific, and may reflect business goals. After completing step 710, the method 700 proceeds to step 714.

At step 714, the agent engages a customer, creating or starting a "session.". Communications or interaction between the agent and customer may be by way of CTI and media gateway, and may be directly monitored or communicated or shared with the system server. After completing step 714, the method 700 proceeds to step 716.

At step 716, the system server listens, monitors, and assesses the session, to include, e.g., assessing utterances and performing a real-time transcription of the session (which is communicated to the agent system and presented on the agent GUI). After completing step 716, the method 700 proceeds to step 718.

At step 718, the system server assesses the session quality, to include performing a sentiment analysis that provides a sentiment measurement. The sentiment measurement may be provided to one or both of the agent system and the supervisor system. During a live call sentiment is captured using the last few utterance transcriptions in the conversation, whereas overall call sentiment (e.g., as depicted as part of call summarization) is calculated using the complete conversation transcript. After completing step 718, the method 700 proceeds to step 722.

At step 722, the system server generates and provides guidance (e.g., checklists, suggested answers) and feedback (e.g., ladder progress indicator, pure or redacted transcript) to the agent. In one embodiment, the transcript is redacted to remove personally identifiable information (PII). After completing step 722, the method 700 proceeds to step 726.

At step 726, the system server assesses agent compliance, such as compliance against one or more tasks required for a particular topic. After completing step 726, the method 700 proceeds to step 730.

At step 730, some or all of the data generated and/or agent assessment (e.g., of compliance) are shared or communicated with the supervisor system. After completing step 730, the method 700 proceeds to step 734.

At step 734, a query is made to determine if the agent or session is non-compliant. If the answer is No (meaning the session or agent are compliant), the method 700 proceeds to step 742. If the answer is Yes (meaning the session or agent are non-compliant), the method 700 proceeds to step 738.

At step 738, a corrective action is determined by the system server and the action is taken (e.g., the agent is provided suggested answers to a customer query). After completing step 738, the method 700 proceeds to step 742.

Figure 10:
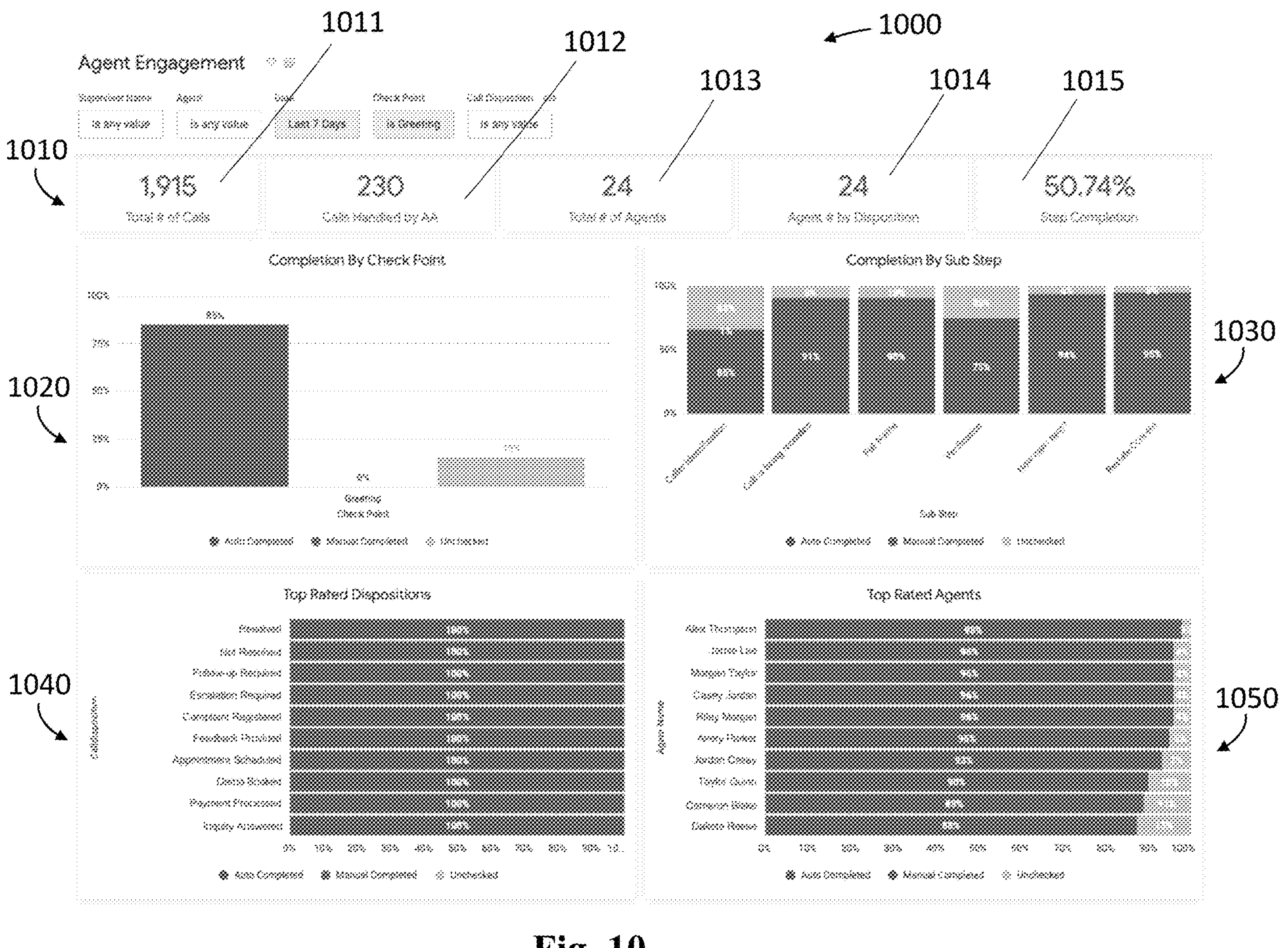
FIG. 10 is a representation of agent insights of the adherence and compliance system of FIG. 6.

At step 742, the session is documented, such as described in FIG. 10. After completing step 742, the method 700 ends.

An example a sequence of actions (or alternative method of use) of an adherence and compliance system is now described. Some aspects or steps or components may be substituted or dropped or added.

1. A call is received from a Contact Center as a Service (CCaaS) platform and is routed to live agent 2. When a call is triggered, call status events like 'Begin Call' and 'Call Established' are pushed to the system server 3. The status events also get pushed to the Media Gateway (MG) from Session Border Controller (SBC) triggering necessary MG events which also get delivered to the system server 4. The system server stores all the incoming events to an event log in the system database (DB)

5. Based on the incoming Dialed Number Identification Service (DNIS) of the call events, appropriate Line of Business (LOB) configuration is fetched and stored in in-memory datastore (e.g., Redis)

6. For an on 'Call Established' status event, workflow relevant to the LOB is published to the appropriate agent's dashboard (mapped using agent extension)

7. Utterance events undergo a Personal Identifiable Information (PII) redaction based on the LOB configuration; PII elements like name, date of birth (DOB), address, phone number, etc., get masked in this process 8. If the utterance event is of partyType='agent', the utterance is pushed to a Natural Language Understanding (NLU) engine (e.g., Vertex/Dialogflow) and intents-entities matched are passed to workflow manager (WFM) within the system server 9. The results from the NLU engine are passed to a Workflow Management (WFM) component within the system server which calls the rule evaluation function with the NLU results as part of a request payload. Any rule if matched is published to a message broker (e.g., Google Pub/Sub). (Note that the phrase "message broker" means an intermediary computer program module that translates a message from the formal messaging protocol of the sender to the formal messaging protocol of the receiver.)

Figure 8:
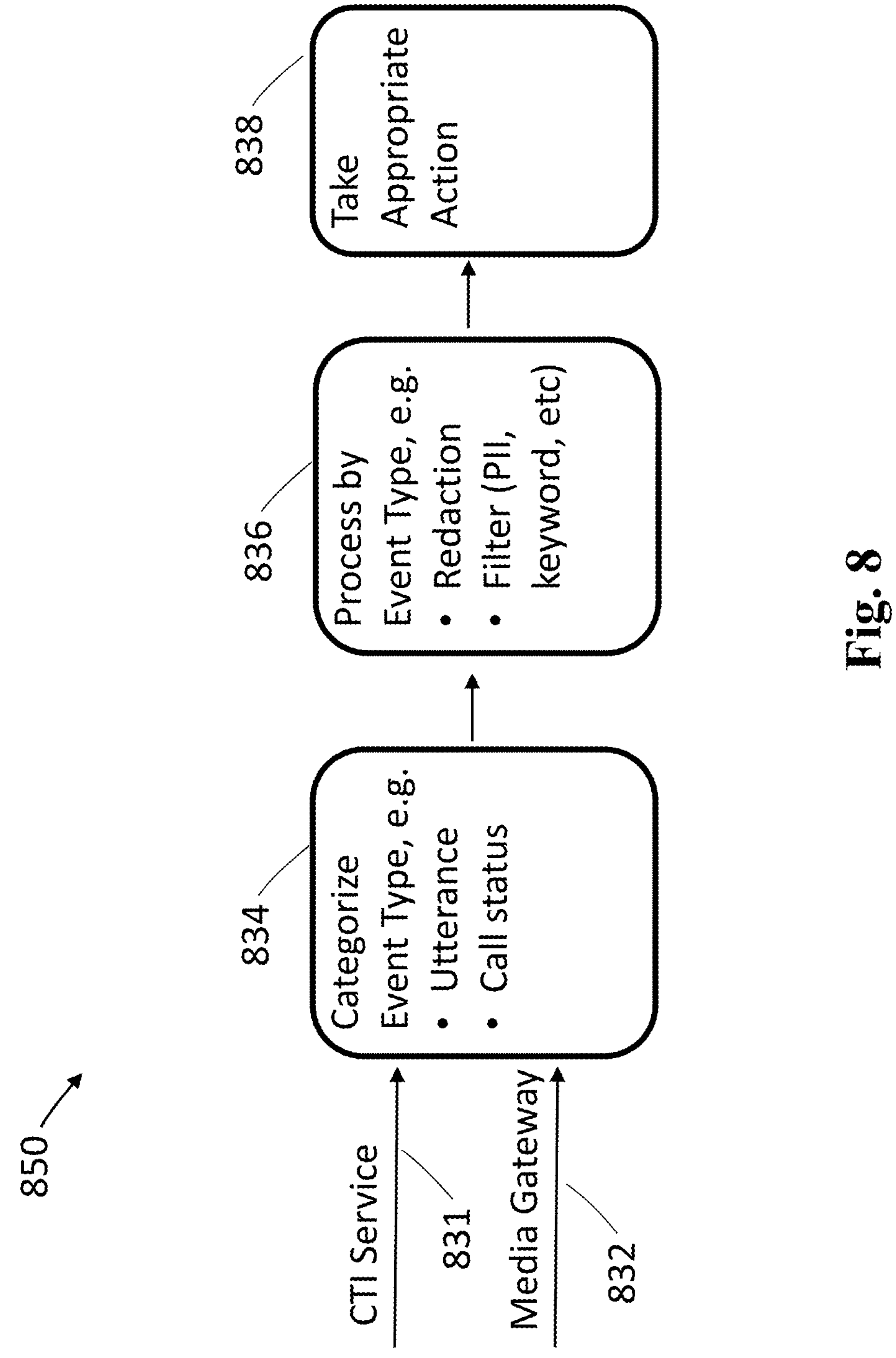
FIG. 8 is a schematic diagram of event categorization and processing aspects of the adherence and compliance system of FIG. 6.

10. The adherence and compliance system (AA Server) publishes to Agent dashboard's User Interface (UI) of any workflow changes based on rule evaluation results 11. If the utterance event is of partyType='customer', the utterance is pushed to an NLU engine and if matching intent is identified for the utterance, following short tail responses is published to the message broker 12. If no intents are matched by the NLU engine, utterance lookup fallbacks to look up against any Knowledge Base (KB) engine that is configured for the LOB and results from the KB lookup are pushed to the message broker 13. Based on the type of user, different interfaces within the system server publish events to a user interface 14. If user logged into the system's UI is an Agent, the events specific to only the agent (mapped by logged in agent's extension) are published to agent dashboard from 'my Answers' interface in the system server 15. If user logged in is a Supervisor, all the events of agent are published to Supervisor dashboard from 'allAnswers' interface in system server FIG. 8 is a schematic diagram of event categorization and processing aspects 850 of the adherence and compliance system of FIG. 6. More specifically, the components described would be performed by the AI engine. The two data feeds (CTI service 831 and media gateway 832) are first categorized by event type, such as an utterance or a call status. Once so categorized, the data are processed by event type, e.g. utterances may be redacted and/or filtered (by filter element 654 of FIG. 6). Lastly, appropriate action is taken, such as sharing the transcript of redacted utterances with the agent system.

Figure 9:
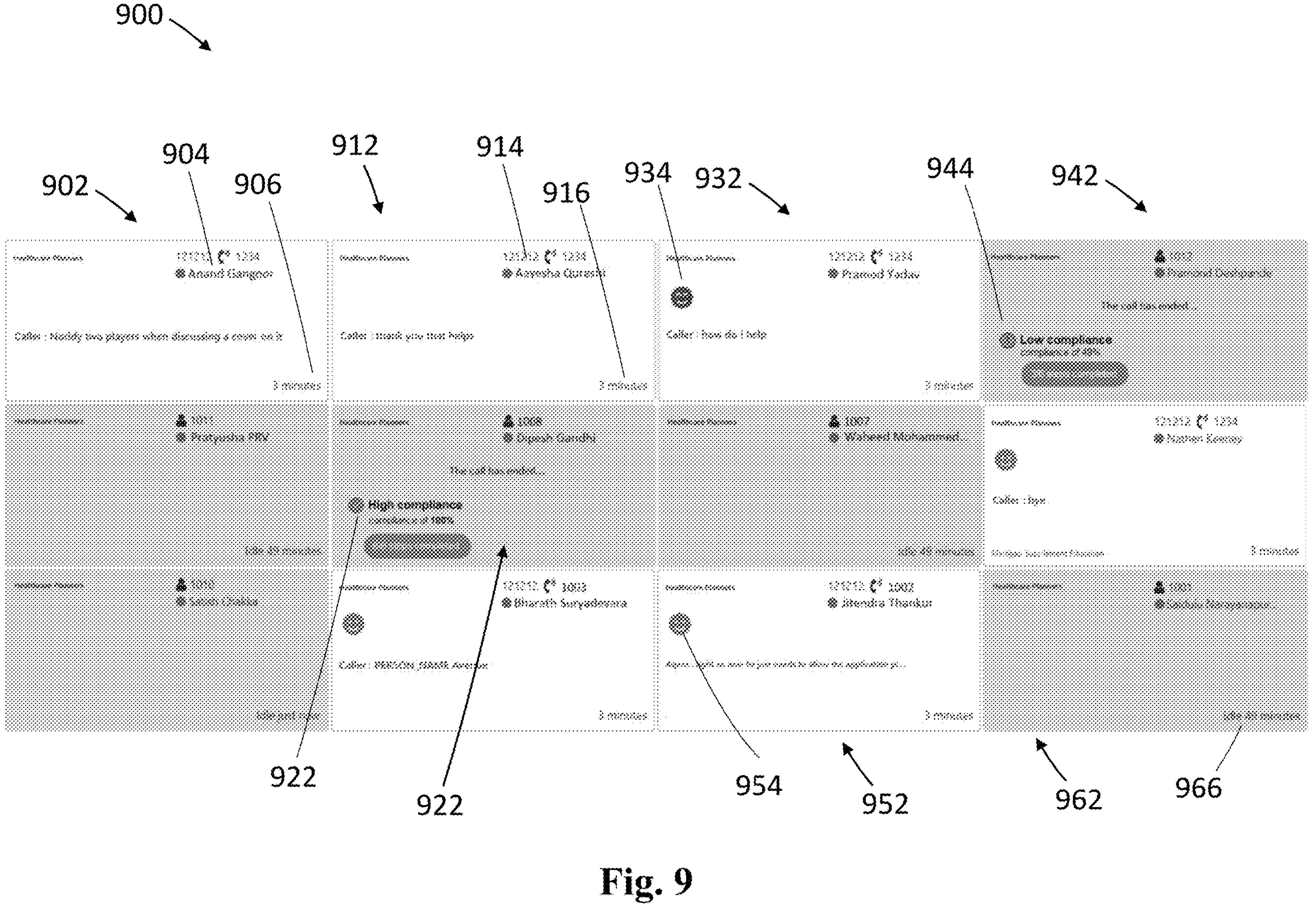
FIG. 9 is a representation of one embodiment of a supervisor dashboard of the adherence and compliance system of FIG. 6.

FIG. 9 is a representation of one embodiment of a supervisor dashboard of the adherence and compliance system of FIG. 6.

The Supervisor Dashboard provides real-time call insight visibility for all agents reporting up to the logged in supervisor. The dashboard provides real-time access and insights into a set of customer-agent calls such as the topic being discussed, transcriptions, and sentiment. Supervisors are responsible for meeting compliance requirements and maintaining a high customer satisfaction score. This means they must know when the best time to intervene is or provide recommendations to their agents to ensure their agents are performing at a high level. The dashboard application allows the supervisor to continuously monitor a set of agent staff and to sort and set thresholds to notify a particular agent when the overall conversational sentiment is negative, which will likely lead to a poor Customer Satisfaction (CSAT) score. The supervisor may also be notified if the agent is missing or not meeting selectable or expected checklist compliance requirements. The supervisor may silently monitor more than one call at a time without being conferenced into call, and thus may assist a set of agents during times when multiple agents have issues. Certain conversational topics that may require additional oversight may be easily monitored by sorting or setting alert.

The Supervisor Dashboard provides a means to monitor agents' activity as an extension to the organization's contact center monitoring tools. It provides real-time AI metrics for calls such as sentiment analysis, topic detection, live transcriptions, and more. Using the live transcriptions and metrics gathers both caller and live agent parties, the system backend constructs feedback helpful for the supervisor.

With respect to FIG. 9, a set of twelve (12) agents are depicted. Those agents actively on a call with a customer are presented with a white background (e.g., agent block 902 of named agent 904, agent block 912 of named agent 914, and agent blocks 932 and 952), and those not so engaged are shown with a grey background (e.g., agent blocks 922, 942, and 966). The time on a call is displayed (e.g., for each of agents 902 and 912 it is 3 minutes) or time idle (e.g., for agent 962 it is 49 minutes). Additional per agent data may also be displayed.

For example, a quantized measure of sentiment tranche may be displayed. In the example of FIG. 9, a set of three sentiments may be displayed: a first sentiment tranche (e.g., a first happy face icon which may be displayed in green, as depicted without color as icon 934 for agent block 932), a second sentiment tranche (e.g., a second (less) happy face icon which may be displayed in gray, as depicted without color as icon 954 in agent block 952), and a third sentiment tranche (e.g., a sad face icon or frown face icon which may be display in red, not depicted on FIG. 9). Additionally, or alternatively, a measure of compliance reaching a selectable threshold or failing to exceed a selectable threshold may be presented. For example, an agent that completes all or 100% of a set of tasks or steps may be deemed to have achieved "high compliance" as shown by the circled check mark adjacent the text "High compliance" at 924 for agent block 922. An agent that fails to exceed 40% of a set of tasks or steps may be deemed to have achieved "low compliance" as shown by the circled exclamation mark adjacent the text "Low compliance" at 934 for agent block 932.

FIG. 10 is a representation of one embodiment of an agent insights display 1000 of the adherence and compliance system of FIG. 6. Among other things, a set of agent engagement insights are presented, such as details on call and checkpoints as pertaining to agents' engagement. Example data presented include: Percentages of steps completed, Percentages of sub steps completed, and Agents and their participation.

The row 1010 of the display 1000 provides a set of five data blocks 1011, 1012, 1013, 1014, and 1015. Data block 1011 presents the total number of calls, meaning the total number of calls into the contact center (this includes calls that may or may not be processed by the adherence and compliance system. Data block 1012 presents the number of calls handled by the adherence and compliance system (referenced as "AA"); these are calls applicable for business units where the system is enabled to listen to the call and is based on DNIS numbers provided by the business. Data block 1013 presents the total number of agents, meaning the count of agents that logged into the system. Data block 1014 presents the agent number by disposition, meaning agent count who logged into the system; this number will vary based on any filter of call disposition. And data block 1015 presents the step completion, meaning the total checklist step completion percentage, whether completed automatically or manually.

The display 1000 also presents a set of four bar chart blocks: 1020, 1030, 1040, and 1050.

Bar chart block 1020 presents completion by check point, which shows the completion rate (both AI auto checked and human manual check) for each check point in the workflow (each check point will have series of steps). For example, Greeting is a check point with about 5 steps within (verify caller, state call is being recorded, etc.). The percentage shows how well Greeting checkpoint is performing (far left bar chart of 85%). The far right bar shows unchecked, percentage that are non-compliant (15%).

Bar chart block 1030 presents completion by sub step, which shows individual check points (a drill down from "Completion by Check Point" chart) to show the completion rate (both AI and human manual check) for each sub step. The higher or upper (lighter shaded) portion of each of the six bars shows unchecked, percentage that are non-compliant.

Bar chart block 1040 presents top rated dispositions, which shows how each call was dispositioned by the contact center agent at the end of the call. The view shows grouping of those calls by (selectable) disposition and degree of compliance. Here, compliance was achieved in each of the ten grouped areas (non-compliance could be presented as a lighter colored portion of a given bar).

Bar chart block 1050 presents top rated agents, which shows which agents are most complaint (those at the upper area, e.g. Alex Thompson has 98% compliance and 2% non-compliance) and those to least compliant, e.g. Dakota Reese has 88% compliance and 13% non-compliance (the percentage should add to 100%, but rounding errors may at times cause a total to add to 101% as here).

The above embodiments may, in combination or separately, may utilize computer software and/or computer hardware (to include, for example, computer-readable mediums) for any of several functions such as automated control or measurement or sensing, and furthermore may utilize one or more graphical user interfaces for human interaction with modules or elements or components.

The exemplary systems and methods of this disclosure have been described in relation to integration and orchestration of intelligent systems. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the methods have been discussed and illustrated in relation to a particular sequence of events, it should be appreciated that changes, additions, and omissions to this sequence can occur without materially affecting the operation of the disclosed embodiments, configuration, and aspects. A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving case and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A customer contact center adherence and compliance system comprising:

a set of agent systems each associated with an agent and comprising an agent widget with an agent GUI, the set of agent systems comprising a first agent system configured to: i) communicate with a first customer in a first session, ii) create first session data comprising first session data utterances, and iii) render a first session display associated with the first session data;

a system server comprising an in-memory datastore, a system database, and an AI engine, the in-memory datastore comprising first session compliance guidelines comprising a set of first session guideline tasks, the system database comprising conversational and compliance records, the AI engine comprising a computer processor configured to: i) receive the first session data from the first agent system, ii) assess the first session data utterances against the first session compliance guidelines to determine a first session status and a first session compliance, and iii) identify a corrective action if the first session compliance is negative; and a supervisor system comprising a supervisor GUI and configured to: i) receive the first session data, and ii) to receive the first session status and the first session compliance from the system server; wherein:

the first agent system communicates the first session data to the system server;

the computer processor performs machine-executable instructions to:

determine a first session status comprising a completion status of the set of first session guideline tasks;

determine a first session compliance;

communicate the first session status and the first session compliance to each of the first agent system and the supervisor system; and if the first session compliance is negative, identify the corrective action and communicate the corrective action to the first agent system.

2. The system of claim 1, wherein the session compliance guidelines are a set of session compliance guidelines associated with a set of session topics, to include a first session topic compliance guideline associated with a first session topic.

3. The system of claim 2, wherein the first session compliance is determined by comparing a particular session topic compliance guideline against the first session data, the particular session topic compliance guideline determined by searching the system database by the first session topic.

4. The system of claim 3, wherein the first session topic is determined by analysis of the first session data utterances.

5. The system of claim 1, wherein the computer processor further performs machine-executable instructions to catalog a task status of each of the set of first session guideline tasks based on the first session utterances and communicating the task status to the first agent system, the first agent system rendering a display associated with the task status.

6. The system of claim 1, wherein the computer processor further performs machine-executable instructions to create a real-time transcript of the first session data utterances, the real-time transcript communicated to the first agent system.

7. The system of claim 6, wherein the computer processor further performs machine-executable instructions to redact any PII data in the real-time transcript to create a redacted real-time transcript, the redated real-time transcript communicated to the first agent system.

8. The system of claim 1, wherein the computer processor further performs machine-executable instructions to determine a first agent sentiment score based on the first session data utterances.

9. The system of claim 8, wherein the first agent sentiment score is communicated to the supervisor system.

10. The system of claim 1, wherein the corrective action is one or more of a suggested answer and a suggested article.

11. A method of using a customer contact center adherence and compliance system, the method comprising:

providing a customer contact center adherence and compliance system comprising:

a set of agent systems each associated with an agent and comprising an agent widget with an agent GUI, the set of agent systems comprising a first agent system configured to: i) communicate with a first customer in a first session, ii) create first session data comprising first session data utterances, and iii) render a first session display associated with the first session data;

a system server comprising an in-memory datastore, a system database, and an AI engine, the in-memory datastore comprising first session compliance guidelines comprising a set of first session guideline tasks, the system database comprising the conversational and compliance records, the AI engine comprising a computer processor configured to: i) receive the first session data from the first agent system, ii) assess the first session data utterances against the first session compliance guidelines to determine a first session status and a first session compliance, and iii) identify a corrective action if the first session compliance is negative; and a supervisor system comprising a supervisor GUI and configured to: i) receive the first session data, and ii) to receive the first session status and the first session compliance from the system server;

communicating the first session data to the system server using the first agent system;

performing machine-executable instructions using the computer processor to:

determine a first session status comprising a completion status of the set of first session guideline tasks;

determine a first session compliance;

communicate the first session status and the first session compliance to each of the first agent system and the supervisor system; and if the first session compliance is negative, identify the corrective action and communicate the corrective action to the first agent system.

12. The method of claim 11, wherein the session compliance guidelines are a set of session compliance guidelines associated with a set of session topics, to include a first session topic compliance guideline associated with a first session topic.

13. The method of claim 12, wherein the first session compliance is determined by comparing a particular session topic compliance guideline against the first session data, the particular session topic compliance guideline determined by searching the system database by the first session topic.

14. The method of claim 13, wherein the first session topic is determined by analysis of the first session data utterances.

15. The method of claim 11, wherein the computer processor further performs machine-executable instructions to catalog a task status of each of the set of first session guideline tasks based on the first session utterances and communicating the tsk status to the first agent system, the first agent system rendering a display associated with the task status.

16. The method of claim 11, wherein the computer processor further performs machine-executable instructions to create a real-time transcript of the first session data utterances, the real-time transcript communicated to the first agent system.

17. The method of claim 16, wherein the computer processor further performs machine-executable instructions to redact any PII data in the real-time transcript to create a redacted real-time transcript, the redated real-time transcript communicated to the first agent system.

18. The method of claim 11, wherein the computer processor further performs machine-executable instructions to determine a first agent sentiment score based on the first session data utterances.

19. The method of claim 18, wherein the first agent sentiment score is communicated to the supervisor system.

20. The method of claim 11, wherein the corrective action is one or more of a suggested answer and a suggested article.

* * * * *